United States Patent
Adolphson et al.

(10) Patent No.: US 8,413,195 B2
(45) Date of Patent: Apr. 2, 2013

(54) CHANNEL CHANGE TO AN AVAILABLE CHANNEL OF A SPECTRUM

(75) Inventors: Alan L. Adolphson, San Diego, CA (US); Vijayalakshmi R. Raveendran, San Diego, CA (US); Yu Albert Wang, Cerritos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 12/788,752

(22) Filed: May 27, 2010

(65) Prior Publication Data

US 2011/0013089 A1 Jan. 20, 2011

Related U.S. Application Data

(60) Provisional application No. 61/226,576, filed on Jul. 17, 2009, provisional application No. 61/295,489, filed on Jan. 15, 2010.

(51) Int. Cl.
*H04N 7/20* (2006.01)
*H04N 7/16* (2011.01)

(52) U.S. Cl. ............ 725/73; 725/62; 725/133; 725/141; 725/153

(58) Field of Classification Search .................... 725/62, 725/133, 141, 153, 73
See application file for complete search history.

(56) References Cited

U.S. PATENT DOCUMENTS

| 2006/0084444 | A1 | 4/2006 | Kossi et al. | |
| 2008/0086286 | A1 | 4/2008 | Shellhammer | |
| 2008/0165754 | A1 | 7/2008 | Hu | |
| 2012/0096498 | A1* | 4/2012 | Wu et al. ................ | 725/81 |

FOREIGN PATENT DOCUMENTS

WO 2008086243 7/2008

OTHER PUBLICATIONS

Federal Communications Commission, FCC 08-260, "In the Matter of Unlicensed Operation in the TV Broadcast Bands, Additional Spectrum for Unlicensed Devices Below 900 MHz and in the 3 GHz Band," Second Report and Order and Memorandum Opinion and Order, released Nov. 14, 2008.
N. Friedrich, "UWB-IR Transmitter Dissipates 29.7 mW At 2.2-V Supply Voltage," ED Online ID #17243, Oct. 2007, http://www.mwrf.com/Articles/ArticleID/17243/17243.html.
Y. Hur et al., "A Cognitive Radio (CR)-based Mobile Interactive Digital Broadcasting Application adopting a Multi-Resolution Spectrum-Sensing (MRSS) Technique," IEEE, 5 pages, 2007.
S.J. Shellhammer et al., "Technical Challenges for Cognitive Radio in the TV White Space Spectrum," Information Theory and Applications Workshop, 2009, Feb. 2009.
Takayasu Norimatsu et al., "A UWB-IR Transmitter With Digitally Controlled Pulse Generator," IEEE Journal of Solid-State Circuits, vol. 42, No. 6, pp. 1300-1309, Jun. 2007.

* cited by examiner

*Primary Examiner* — Hunter B Lonsberry
(74) *Attorney, Agent, or Firm* — Kevin T. Cheatham

(57) ABSTRACT

In general, this disclosure relates to techniques for transmitting data in a spectrum, and seamlessly switching from one transmission channel to an available channel in the spectrum. One example method comprises identifying, by a device, at least a first channel of a spectrum, transmitting at least one command to a second, different device, wherein the at least one command contains information that allows the second device to determine at least the first identified channel, and transmitting data in at least the first identified channel.

54 Claims, 14 Drawing Sheets

CHANNEL CHANGE TO AN AVAILABLE CHANNEL OF A SPECTRUM

This application claims the benefit of U.S. Provisional Application 61/226,576, filed on Jul. 17, 2009, and U.S. Provisional Application 61/295,489, filed on Jan. 15, 2010, the entire content of each of which is incorporated herein by reference.

TECHNICAL FIELD

This disclosure relates to the transmission of data in a network.

BACKGROUND

Presently, several solutions for the wireless display of multimedia data, such as wireless HDMI (High-Definition Multimedia Interface), are in development. The primary intent for these solutions is to replace the HDMI cable between a particular component (e.g., set-top box, digital versatile disc (DVD) player, computing device) and a display device.

Certain providers have developed solutions that use proprietary methodologies for the transmission of uncompressed video. Other solutions may target consumer electronic devices (e.g., game consoles or DVD players) and require dedicated hardware on both the host and client side. The power consumption for such dedicated devices may be quite high. In addition, the transmission of uncompressed video in certain solutions may limit any expansion capabilities to support higher-resolution data transmission.

SUMMARY

In general, this disclosure relates to techniques for transmitting data in a spectrum, and switching from one transmission channel to another available transmission channel in the spectrum. Certain techniques may facilitate the wireless transmission of data for various services/applications from one or more devices (e.g., mobile or handheld device) to an external device utilizing an identified, available channel of a spectrum. A distinct transmitter may be used to facilitate channel change functionality. For example, a transmitting device may include both a primary transmitter to transmit data, and another, distinct transmitter to send channel change information to an external device using wireless communication (e.g., infrared, radio frequency communication).

An example method comprises identifying, by a device, at least a first channel of a spectrum, transmitting at least one command to a second, different device, wherein the at least one command contains information that allows the second device to determine at least the first identified channel, and transmitting data in at least the first identified channel.

An example communication system comprises one or more processors, a channel identifier, a transmitter, and a channel transmitter. The transmission channel identifier is operable by the one or more processors to identify at least a first channel of a spectrum. The channel transmitter is operable by the one or more processors to transmit at least one command to a second, different device, wherein the at least one command contains information that allows the second device to determine at least the first identified channel. The transmitter is operable by the one or more processors to transmit data in at least the first identified channel.

An example computer-readable storage medium is encoded with instructions for causing one or more processors to identify at least a first available channel of a spectrum, and transmit at least one command to a device, wherein the at least one command contains information that allows the device to determine at least the first identified available channel, and transmit data in at least the first identified available channel.

The techniques described in this disclosure may be implemented in hardware, software, firmware, or any combination thereof. For example, various techniques may be implemented or executed by one or more processors. As used herein, a processor may refer to a microprocessor, an application specific integrated circuit (ASIC), a field programmable gate array (FPGA), a digital signal processor (DSP), or other equivalent integrated or discrete logic circuitry. Software may be executed by one or more processors. Software comprising instructions to execute the techniques may be initially stored in a computer-readable medium and loaded and executed by a processor.

Accordingly, this disclosure also contemplates computer-readable storage multimedia comprising instructions to cause a processor to perform any of a variety of techniques as described in this disclosure. In some cases, the computer-readable storage medium may form part of a computer program storage product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

DETAILED DESCRIPTION

Figure 1:
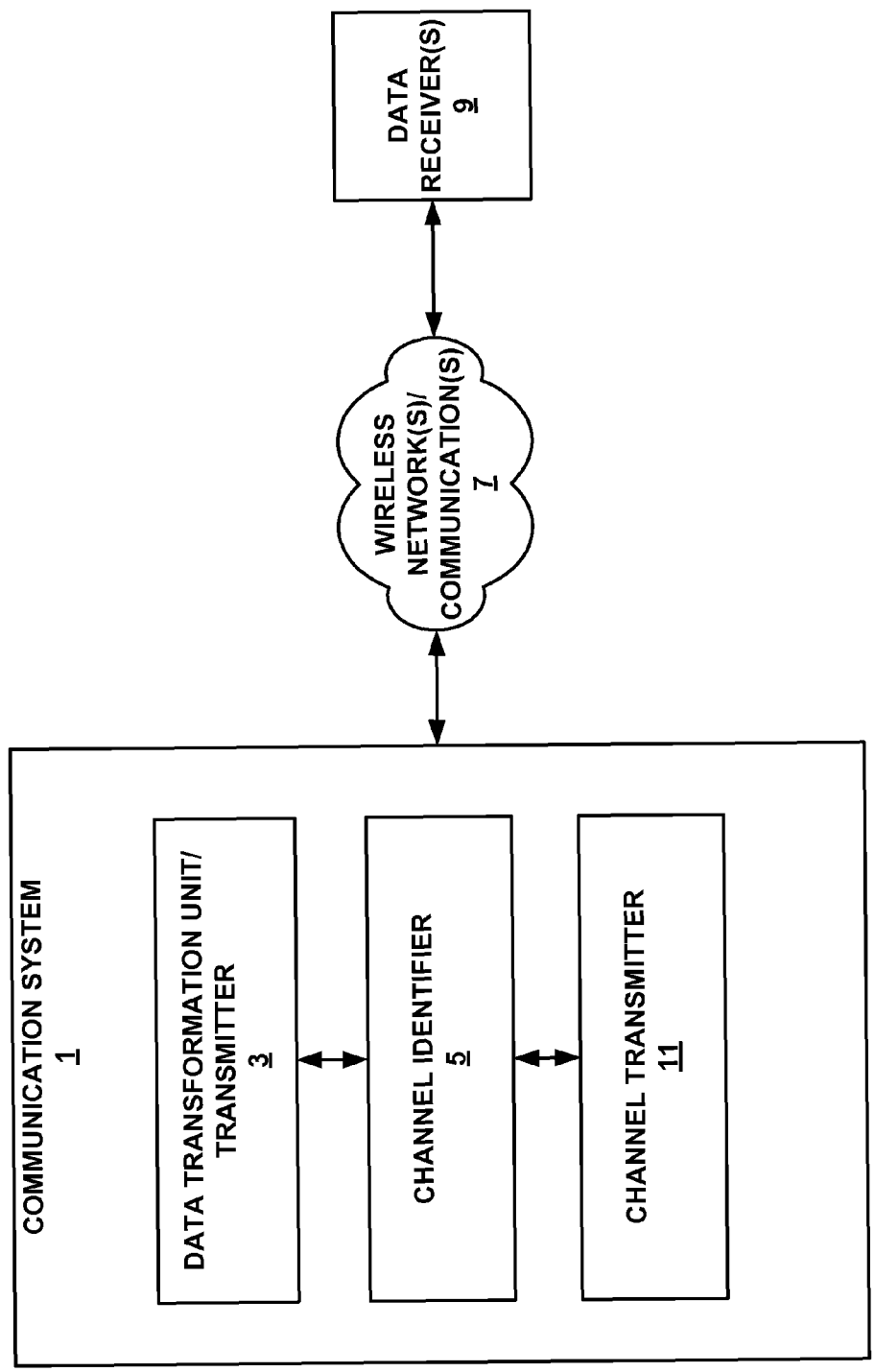
FIG. 1 is a block diagram illustrating an example of a communication system, including a channel transmitter, which is communicatively coupled to one or more data receivers via one or more wireless networks.

FIG. 1 is a block diagram illustrating an example of a communication system 1, including a channel transmitter 11, which is communicatively coupled to one or more data receivers 9 via one or more wireless networks and/or wireless communications 7. Communication system 1 is capable of sending data to data receivers 9. In some cases, the data may comprise multimedia data including at least one of audio data, video data, text data, speech data, and graphics data. In the example of FIG. 1, although communication system 1 is shown as only sending data to one data receivers 9 via wireless networks/communications 7, communication system 1 may also, in some cases, be capable of sending or broadcasting data to one or more data receivers, including data receivers 9, via wireless networks/communications 7.

In some instances, wireless networks/communications 7 may comprise a network providing support for communications across a spectrum for a digital broadcast format, such as an Advanced Television Systems Committee (ATSC) format, a Digital Video Broadcasting (DVB) format, a Terrestrial Digital Multimedia Broadcasting (T-DMB) format, an Integrated Services Digital Broadcasting Terrestrial (ISDB-T) format, or a Moving Picture Experts Group Transport Stream (MPEG-TS) format, provided by International Standard ISO/IEC 13818-1, to name only a few, as will be described in more detail below. ATSC standards are a set of standards developed by the Advanced Television Systems Committee for digital television transmission. DVB standards are a suite of internationally accepted, open standards for digital television, and are published by a Joint Technical Committee (JTC) of European Telecommunications Standards Institute (ETSI), European Committee for Electrotechnical Standardization (CENELEC), and European Broadcasting Union (EBU). DMB is a digital radio transmission technology for sending multimedia data to mobile devices. ISDB is a Japanese standard for digital television and digital radio.

A digital broadcast format may be a broadcast format in which no specific or particular destination is provided in or specified by the transmitted data. For example, a digital broadcast format may comprise a format in which the header of a broadcasted data packet or unit does not include any destination address.

Wireless networks/communications 7 may further include one or more wireless communications, such as infrared or other radio frequency communications. These wireless communications may allow channel transmitter 11 to provide channel information to data receivers 9.

Communication system 1 may comprise a fixed system of one or more devices, which transmits or receives data at a specified location, or a mobile system of one or more devices. Each device may comprise one or more processors. Communication system 1 may comprise one or more stand-alone devices or may be part of a larger system. For example, communication system 1 may comprise, or be part of, a wireless communication device (e.g., wireless mobile handset or device), a digital camera, digital television (TV), a video camera, a video telephone, a digital multimedia player, a personal digital assistant (PDA), a video game console, a personal computer or laptop device, or other video device.

In certain examples, communication system 1 may be used for video game or gaming applications. In these examples, one or more users of communication system 1 may play one or more games, including any interactive games with other users via a network connection (e.g., wireless network connection) to communication system 1. Graphics and/or video data for the games, including real-time information, may be provided to data receivers 9, which may then be displayed on a separate display device coupled to data receivers 9 (e.g., a high-definition television or display device). In this fashion, a user may view the display data for a game application on this separate display device.

Communication system 1 may also comprise one or more peripheral devices (e.g., keyboards), including peripheral devices that communicate wirelessly with other devices. In some cases, communication system 1 may include components that are included within one or more integrated circuits, or chips, which may be used in some or all of the devices described above.

As shown in FIG. 1, communication system 1 may include a data transformation unit/transmitter 3, which is coupled to a channel identifier 5. Data transformation unit/transmitter 3 and channel identifier 5 may be physically included, or part of, one or more devices. For example, in some cases, one or both of data transformation unit/transmitter 3 and channel identifier 5 could be included within a peripheral device that is coupled to a separate device. Thus, data transformation unit/transmitter 3 and channel identifier 5 may be part of one or more devices within communication system 1.

Communication system 1 is capable of receiving, processing, and generating data. For example, communication system 1 may receive data over any of many possible radio or access networks, including cellular, local wireless, or broadcast networks, including for example, ATSC, DVB, ISDB-T, or T-DMB. In some instances, communication system 1 may receive data over a wired interface or via one or more embedded interfaces. The data may also comprise data in an uncompressed format, such as data received via image/video sensors for camera or other camcorder applications. In some examples, the data may include one or more of audio data, video data, graphics data, text data, speech data, or metadata.

Communication system 1 is further capable of broadcasting or otherwise transmitting data to one or more other devices, such as data receivers 9, through wireless networks/communications 7. Data transformation unit/transmitter 3 is capable of transforming data into a particular digital broadcast format. For example, data transformation unit/transmitter 3 may be capable of encoding data that complies with a particular digital broadcast format (e.g., ATSC, DVB, ISDB-T, T-DMB, MPEG-TS), modulating and then transmitting the encoded data.

Channel identifier 5 is able to identify at least one available channel of a spectrum, where one or more devices of communication system 1 may be involved in the identification of the at least one available channel. For example, the identification of the at least one available channel may be initiated by one or more devices of communication system 1. In some instances, channel identifier 5 may identify the at least one available channel in an unused and/or unlicensed portion of a broadcast spectrum, such as a digital television broadcast spectrum. In some instances, the at least one available channel may comprise television band white space. As specified in the "Second Report and Order and Memorandum Opinion and Order" adopted by the Federal Communications Commission (FCC) on Nov. 4, 2008, and released on Nov. 14, 2008 as FCC Order 08-260, "white space" may comprise unused portions or locations of a broadcast television spectrum that are not currently being used by licensed services, and which therefore may be used by unlicensed radio transmitters.

In some instances, an available channel may comprise a channel that is currently unoccupied. In one example, an available channel may comprise a channel that is not currently being used by any authorized or licensed users, e.g., users licensed by the FCC. In one example, an available channel may comprise a channel that is not currently being used either by licensed users or by unlicensed users, e.g., other white space channel users. In some cases, an available channel may comprise a channel that may be used by a user upon acquiring a secondary license from another licensed user.

Channel identifier 5 may identify one or more available channels that may be needed for data broadcast based upon any specific requirements or needs of applications or services that are executed on, or implemented by, one or more devices of communication system 1. Upon identification of the one or more available channels, transformation unit/transmitter 3 may transmit data (e.g., encoded, modulated, or otherwise transformed data) to data receivers 9 via wireless networks/communications 7, using the at least one identified available channel. In certain cases, communication system 1 will perform one or more of the above-described actions, either automatically or via user input, based upon the execution of one or more services or applications locally running within communication system 1. Data receivers 9 may include functionality for demodulating and/or decoding the received broadcast data from communication system 1. In some cases, transformation unit/transmitter 3 may broadcast the data, via wireless networks/communications 7, to multiple data receivers, including data receivers 9, using the at least one identified available channel.

As described above, channel identifier 5 is able to identify at least one available channel of a broadcast spectrum for the particular digital broadcast format. In one example, channel identifier 5 may include a spectrum sensor that is used to identify the at least one available channel by sensing signal information within one or more channel ranges, or bands, within the broadcast spectrum. In one example, channel identifier 5 may access a database (e.g., a digital TV bands database, such as the one shown in FIG. 6) to identify the at least one available channel.

As shown in FIG. 1, communication system 1 includes a channel transmitter 11. Communication system 1 is capable of transmitting data over an unused portion of a broadcast spectrum, and switching from one transmission channel to another. For example, communication system 1 may utilize an identified, available channel in an unused portion of a spectrum, and transmit data using this available channel via wireless networks/communications 7 to data receivers 9. In some instances, communication system 1 may need to vacate a particular channel upon subsequent detection of use of the channel by a licensed user. In these instances, communication system 1 may need to identify a different available channel for use in transmitting further data to data receivers 9. In such instances, channel transmitter 11 is capable of transmitting channel change information to data receivers 9 via wireless networks/communications 7.

For example, channel identifier 5 may identify a first channel at a first point in time that is available for use by communication system 1 to transmit data. Channel transmitter 11 may send information to data receivers 9, via wireless network/communications 7, which allows data receivers 9 to determine or identify the first channel. For instance, channel transmitter 11 may send information that directly specifies the first channel or otherwise allows data receivers 9 to determine the first channel based upon the received information.

At a later point in time, channel identifier 5 may determine that the first channel is no longer available to use by communication system 1. For example, if another user (e.g., licensed user) has taken over occupancy of the first channel, or if the first channel otherwise becomes unavailable, channel identifier 5 may need to identify a second, different channel that is currently available for use by communication system 1 in sending subsequent data via wireless networks/communications 7. Upon identification of such a second channel, channel transmitter 11 is capable of transmitting information via wireless networks/communications 7 that allows data receivers 9 to determine or identify the new, second channel. Data receivers 9 are then capable of receiving data transmissions from communication system 1 over the second channel.

In order to make the channel change with minimal interruption (e.g., to the listening and/or viewing experience of the user), a closed loop control mechanism or protocol may be utilized. Such a control mechanism may comprise an out-of-band means of communication or alternate communication protocol between channel transmitter 11 and data receivers 9 via wireless networks/communications 7. For example, channel transmitter 11 may utilize an infrared or radio frequency communication to transmit channel change information to data receivers 9 via wireless networks/communications 7, such that data receivers 9 may efficiently change channels with minimal interruption to end users of devices (e.g., display devices) that be included within or otherwise coupled to data receivers 9. In some cases, data transformation unit/transmitter 3 may send some overlap of, or redundant, information across a previously used channel and a newly selected channel to minimize any disruption or impact of data flow processed by data receivers 9.

In some examples, channel transmitter 11 may comprise a low power, low cost infrared (IR) transmitter that may be embedded within a portable device included within communication system 1. The transmit power of channel transmitter 11 may be configurable and may also be user programmable.

Channel transmitter 11 may not be in a line-of-sight with the receiver. In this case, if channel transmitter 11 comprises an infra-red (IR) based transmitter, a higher output power of channel transmitter 11 may enable the light to bounce off of obstacles to reach data receivers 9 and close the loop. Alternatively, if channel transmitter comprises an IR-based transmitter, channel transmitter 11 may have a reflector, potentially directed towards data receivers 9. In some instances, the transmit power of channel transmitter 11 may be determined by communication system 1. For example, communication system 1 may detect interference and/or noise associated communication between channel transmitter 11 and data receivers 9, and may then automatically set the transmit power accordingly. For instance, if communication system 1 detects an amount of interference or noise above a defined threshold, communication system 1 may automatically increase the transmit power.

Channel transmitter 11 is not limited, however, to provide IR-based communication. For example, channel transmitter 11 may provide any number of radio frequency or wireless communications via wireless network/communications 7 to data receivers 9. For example, channel transmitter 11 may implement Bluetooth®, ZigBee®, UWB, wireless personal area network (WPAN), or other low power, wireless RF protocols as an alternative to or in addition to IR. Hence, channel transmitter 11 could utilize IR communication, RF communication, or a combination of both. In many instances, data receivers 9, or devices including or otherwise coupled to data receivers 9 (e.g., display devices), may have one or more in-built IR receivers/decoders. Thus, in various aspects, channel transmitter 11 may provide IR-based communication to provide compatibility with any device that includes an IR receiver/decoder, and may also provide backward compatibility with display devices that include such IR receivers/decoders and that may also provide support for other wireless communications (e.g., Bluetooth® communication).

The use and implementation of channel transmitter 11 may provide one or more advantages. For example, when communication device 1 changes the channel on which it is transmitting, data receivers 9 can be updated almost instantaneously to maintain minimal disruption of service. A user of one of data receivers 9 may not have to intervene in changing channels, as a dynamic frequency selection algorithm can automatically command data receivers to switch to a new channel. In addition, if data receivers 9 include multiple receivers, channel transmitter 11 is capable of communicating channel change information to multiple different data receivers. Furthermore, channel transmitter 11 may communicate different channel change information to different data receivers.

For instance, communication system 1 may transmit information to a first data receiver using a first identified available channel. Communication system 1 may transmit information, which may either be the same or different information (e.g., same or different program or content) to a second data receiver using a second identified available channel, which may or may not comprise a different channel from the first identified channel. If the first and/or second channel become unavailable at some point in time, channel transmitter 11 of communication system 1 is capable of separately communicating channel change information to the first and second data receivers 9. As a result, communication system 1 is capable of providing channel change information to multiple different data receivers, which may be part of or coupled to multiple devices (e.g., televisions, display devices).

In instances where channel transmitter 11 communicates channel information to multiple receivers (e.g., multiple display devices), channel transmitter 11 may also be programmed dependent on security codebooks of the corresponding receivers. For instance, different types (e.g., brands/models) of display devices may provide different codebooks. Thus, in some cases, channel transmitter 11 may include a first unique code, based upon a first codebook supported by a first data receiver, when sending channel information to a first data receiver. Channel transmitter 11 may include a second, different unique code, based upon a second codebook supported by a second data receiver, when sending channel information to a second, different data receiver.

Figure 2A:
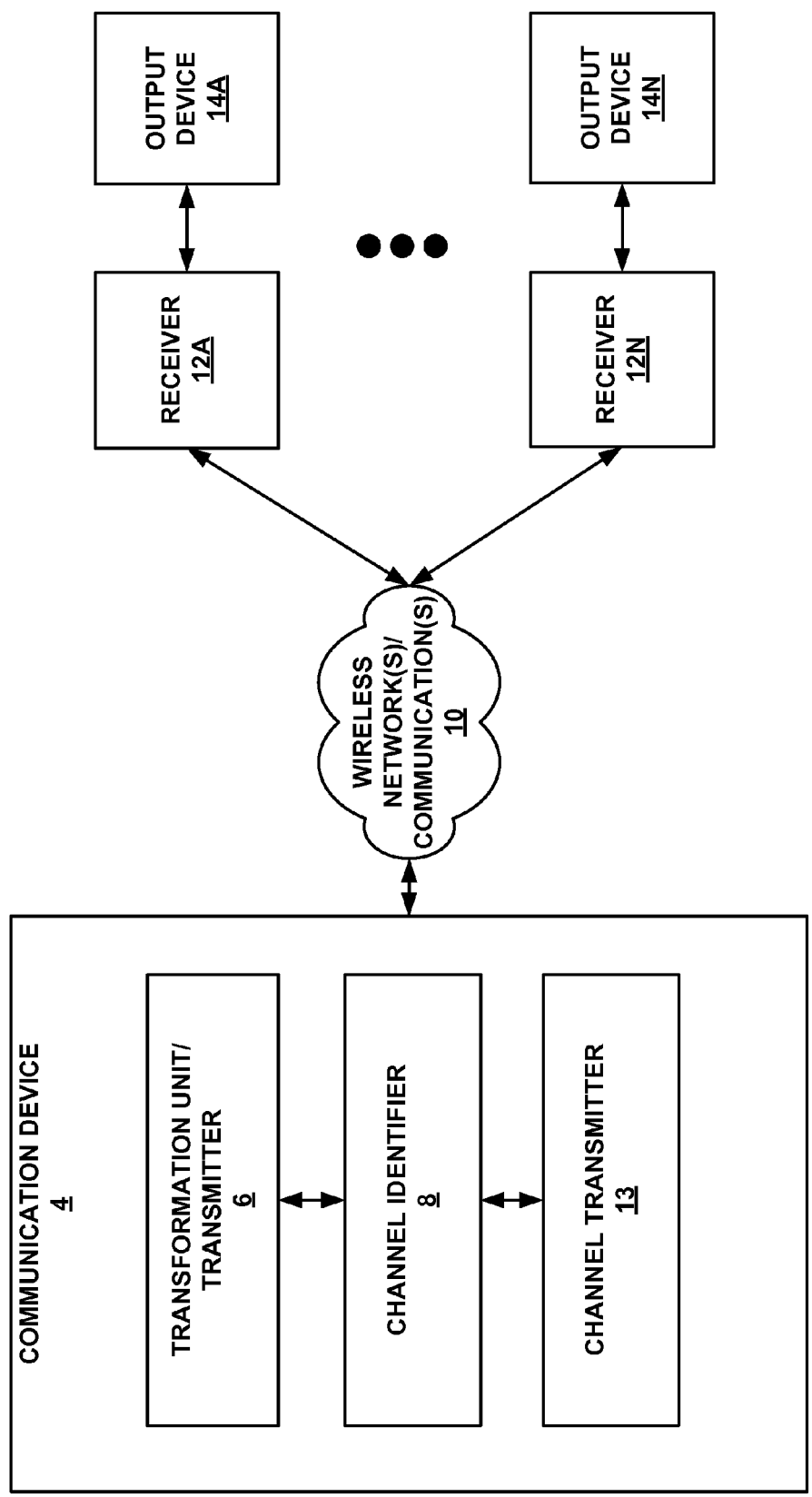
FIG. 2A is a block diagram illustrating an example of a communication device, including a channel transmitter, which is communicatively coupled to one or more receivers that are coupled to one or more output devices.

FIG. 2A is a block diagram illustrating an example of a communication device 4, which includes a channel transmitter 13, being communicatively coupled to one or more communication receivers 12A-12N and one or more output devices 14A-14N via one or more wireless networks/communications 10. Communication device 4 is capable of sending data (e.g., multimedia data) to one or more of receivers 12A-12N. In some cases, the data may comprise multimedia data including at least one of audio data, video data, text data, speech data, and graphics data.

In the particular example of FIG. 2A, transformation unit/transmitter 6, channel identifier 8, and channel transmitter 13 are included within one particular device, namely communication device 4. As described previously, however, with respect to FIG. 1, a transformation units/transmitter, channel identifier, and channel transmitter in general may be included within one or more devices, including one or more peripheral devices, within a communication system.

Similar to wireless networks/communications 7 of FIG. 1, wireless networks/communications 10 may comprise one or more networks that provide support for communications across a broadcast spectrum for a digital broadcast format, such as ATSC, DVB, T-DMB, ISDB-T, or MPEG-TS, to name only a few. Communication device 4 may comprise a fixed device, which transmits or receives data at a specified location, or a mobile device. Communication device 4 may comprise a stand-alone device or may be part of a larger system. For example, communication device 4 may comprise, or be part of, a wireless multimedia communication device (such as a wireless mobile handset), a digital camera, digital TV, a video camera, a video telephone, a digital multimedia player, a personal digital assistant (PDA), a video game console, a personal computer or laptop device, or other video device. Communication device 4 may also be included within one or more integrated circuits, or chips, which may be used in some or all of the devices described above.

Wireless networks/communications 10 may further include one or more wireless communications, such as infrared or other radio frequency communications. These wireless communications may allow channel transmitter 13 to provide channel information to one or more of receivers 12A-12N.

As shown in FIG. 2A, communication device 4 includes transformation unit/transmitter 6, which is coupled to channel identifier 8. For purposes of illustration only in FIG. 2A, it will be assumed that these components 6, 8 are part of communication device 4.

Communication device 4 is capable of receiving, processing, and generating data, including multimedia data. For example, communication device 4 may receive data over any of many possible radio or access networks, including cellular, local wireless, or broadcast format, including ATSC, DVB, ISDB-T, or T-DMB.

Communication device 4 is further capable of broadcasting data to one or more other devices, such as output devices 14A-14N, through wireless networks/communications 10. Transformation unit/transmitter 6 is capable of transforming data into a particular digital broadcast format. For example, transformation unit/transmitter 6 may be capable of encoding multimedia data that complies with a particular digital broadcast format (e.g., ATSC, DVB, ISDB-T, T-DMB, MPEG-TS), and modulating the encoded multimedia data.

Channel identifier 8 is able to identify at least one available channel of a spectrum, where the identification is initiated by communication device 4. In some cases, channel identifier 8 may identify multiple available channels that may be needed for transmission based upon any specific requirements or needs of applications or services that are executed on communication device 4. For example, an application or service may request or utilize multiple channels for providing information to a remote destination. In one scenario, an application may transmit a first multimedia data stream to a first one of receivers 12A-12N across a first channel, and may transmit a second multimedia data stream to a second one of receivers 12A-12N across a second, different channel.

In another example, an application or service may utilize multiple channels when sending data to a given one of receivers 12A-12N. In this example, the application or service may transmit a first portion or component of a given data stream to a receiver, but may transmit a second portion or component of the data stream to the same receiver. Transformation unit/ transmitter 6 may determine which portions of the data stream are transmitted across which channels in this example.

Upon identification of the one or more available channels, transformation unit/transmitter 6 may transmit the transformed (e.g., encoded, modulated) data to one or more of output devices 14A-14N, via wireless network/communications 10, using the at least one identified available channel. In certain cases, communication device 4 will perform one or more of the above-described actions, either automatically or via user input, based upon the execution of one or more services, or applications, locally running on communication device 4.

For example, in one example, an application may determine to broadcast specified multimedia content solely to output device 14A via wireless networks/communications 10. Receiver 12A may receive the broadcast data, and may include a tuner that tunes receiver 12A to the appropriate channel through which data is being broadcast from communication device 4. Receiver 12A then provides the received data to output device 14A for processing (e.g., for display).

In another example, an application may determine to broadcast specified multimedia content to multiple ones of output devices 14A-14N. In this case, receivers 12A-12N may each receive the broadcasted data, and may each include a tuner that tunes in to the appropriate channel (e.g., frequency or frequency band) through which data is being broadcast from communication device 4. Each receiver 12A-12N then provides the received data to its corresponding output device 14A-14N for processing.

In some cases, receivers 12A-12N may include functionality for demodulating and/or decoding the received broadcast data from communication device 4. In some cases, output devices 14A-14N may include such functionality. One or more of output devices 14A-14N may each comprise an external device with respect its corresponding receiver 12A-12N. In some instances, one or more of output devices 14A-14N may each be part of, or integrated within, its corresponding receiver 12A-12N.

As described above, channel identifier 8 is able to identify at least one available channel of a broadcast spectrum for the particular digital broadcast format. In one example, channel identifier 8 may include a spectrum sensor that is used to identify the at least one available channel by sensing signal information within one or more channel ranges, or bands, within the broadcast spectrum. In one example, channel identifier 8 may access a database (e.g., a digital TV bands database, such as the one shown in FIG. 6) to identify the at least one available channel.

For instance, communication device 4 may include geo-location functionality, whereby communication device 4 is capable of determining its geographic location, e.g., by using a Global Positioning System (GPS) or other similar component, pilot signal or other location techniques. In this instance, communication device 4 may provide such location information to a digital TV bands database. The digital TV bands database may be populated with channel information based upon location, and may be able to provide communication device 4 with a list of any available channels within the geographic region currently occupied by communication device 4.

In some examples, communication device 4 may be capable of determining its geographic location via location estimation using an Internet Protocol (IP) address of communication device 4. Geo-location by IP address is a technique of determining a geographic latitude, longitude, and also potentially city and state of communication device 4 by comparing public IP address of communication device 4 with IP addresses of other electronically neighboring servers, routers, or other devices having known locations. In these examples, communication device 4 may provide its IP address to an external server (e.g., via wireless communication). The external server may access a database containing IP addresses of other devices having known locations. The external server may use techniques to obtain an estimate of the location of communication device 4 by comparing the IP address of communication device 4 to the IP addresses of the devices having known locations within the database, and may then provide this estimated location back to communication device 4. The external server may, in some cases, perform the comparison by determining which devices within the database have IP addresses that most closely match or resemble the IP address of communication device 4.

The broadcast of data from communication device 4 to one or more of output devices 14A-14N may provide certain advantages. For example, local broadcasts from communication device 4 to output devices 14A-14N can be created similar to a distributed transmitter network. Thus, in one scenario, a user may utilize communication device 4 to broadcast multimedia data to other co-located or non-co-located output devices 14A-14N. For instance, a user may set up a wireless network in the user's home to couple communication device 4 to other devices. Communication device 4 may comprise, in one example, a personal or laptop computer.

The user may wish to transmit multimedia data (e.g., a personal presentation, a television show or movie, web content, streaming video, digital photographs), as processed by communication device 4, to one or more of output devices 14A-14N. If output devices 14A-14N comprise one or more televisions, for instance, communication device 4 may identify one or more available channels to broadcast such multimedia data to these one or more televisions, providing a convenient way to extend content from a computer to a television (e.g., large screen and/or high-definition television) without the need for using any wires or other physical connections.

Communication device 4 includes a channel transmitter 13, which may provide functionality that is similar to channel transmitter 11 described in reference to FIG. 1. Channel transmitter 13 is capable of providing information to one or more of receivers 12A-12N that allows the receiver to identify or determine the channel. For instance, channel transmitter 13 may send one or more commands to a data receiver that either directly or indirectly specify a channel or a channel change. The commands may, for example, explicitly identify the channel(s) over which data is to be transmitted from transformation unit/transmitter 6. In other cases, such as when there is a channel change, the commands may indicate a type or direction of channel change with respect to a previously used channel.

Thus, in one scenario, if communication device 4 had previously been transmitting data across a first channel, but determines that it will subsequently send data across a second channel (e.g., if the first channel becomes occupied or is no longer available), channel transmitter 13 may send one or more commands to one or more of receivers 12A-12N explicitly identifying the second channel as the new channel. In other cases, channel transmitter 13 may send one or more commands specifying a channel change (e.g., channel up command, channel down command). Receivers 12A-12N are able to identify or determine the new (i.e., second) channel based upon the received commands, and optionally also based upon information regarding the previously used channel, such as in the case of receiving channel-up or channel-down commands.

Furthermore, FIG. 2A shows that communication device 4 may transmit or broadcast data that is received by one or more receivers 12A-12N. Thus, channel transmitter 13 is capable of communicating channel change information to multiple different data receivers. Furthermore, channel transmitter 13 may communicate different channel change information to different data receivers.

For instance, communication device 4 may transmit information to a first data receiver 12A using a first identified available channel. Communication device 4 may also transmit information, which may either be the same or different information (e.g., same or different program or content) to a second data receiver 12N using a second identified available channel, which may or may not comprise a different channel from the first identified channel. If the first and/or second channel become unavailable at some point in time, channel transmitter 13 of communication system 1 is capable of separately communicating channel change information to the first and second data receivers 12A and 12N. As a result, communication device 4 is capable of providing channel change information to multiple different data receivers 12A-12N, which may be part of or coupled to multiple output devices 14A-14N (e.g., televisions, display devices).

In one aspect, channel transmitter 13 may transmit channel command information that comprises different identification codes when transmitting channel information to different receivers. For example, receiver 12A may store or contain a first unique code (e.g., number or other identifier), and receiver 12N may store or contain a second unique code. Receivers 12A and 12N may be pre-programmed to include such codes, or may receive these codes from communication device 4 during configuration.

When transmitting channel command information via wireless networks/communications 10 that is intended for receiver 12A, channel transmitter 13 may include the first unique code within the command information. Upon receipt of the command information, receiver 12A will compare the first unique code included within the information to its own stored code to identify a match, and thereby determine that it should process the command information. Receiver 12N may also receive the command information, but may disregard or ignore the information upon comparing the first unique code included within the information to its own stored code and determining that there is no match.

When transmitting channel command information via wireless networks/communications 10 intended for receiver 12N, on the other hand, channel transmitter 13 may include the second, different unique code within the command information. Receiver 12A may ignore this command information, but receiver 12N is able to process the received command information upon comparing the received second unique code to its stored code and identifying a match.

Figure 2B:
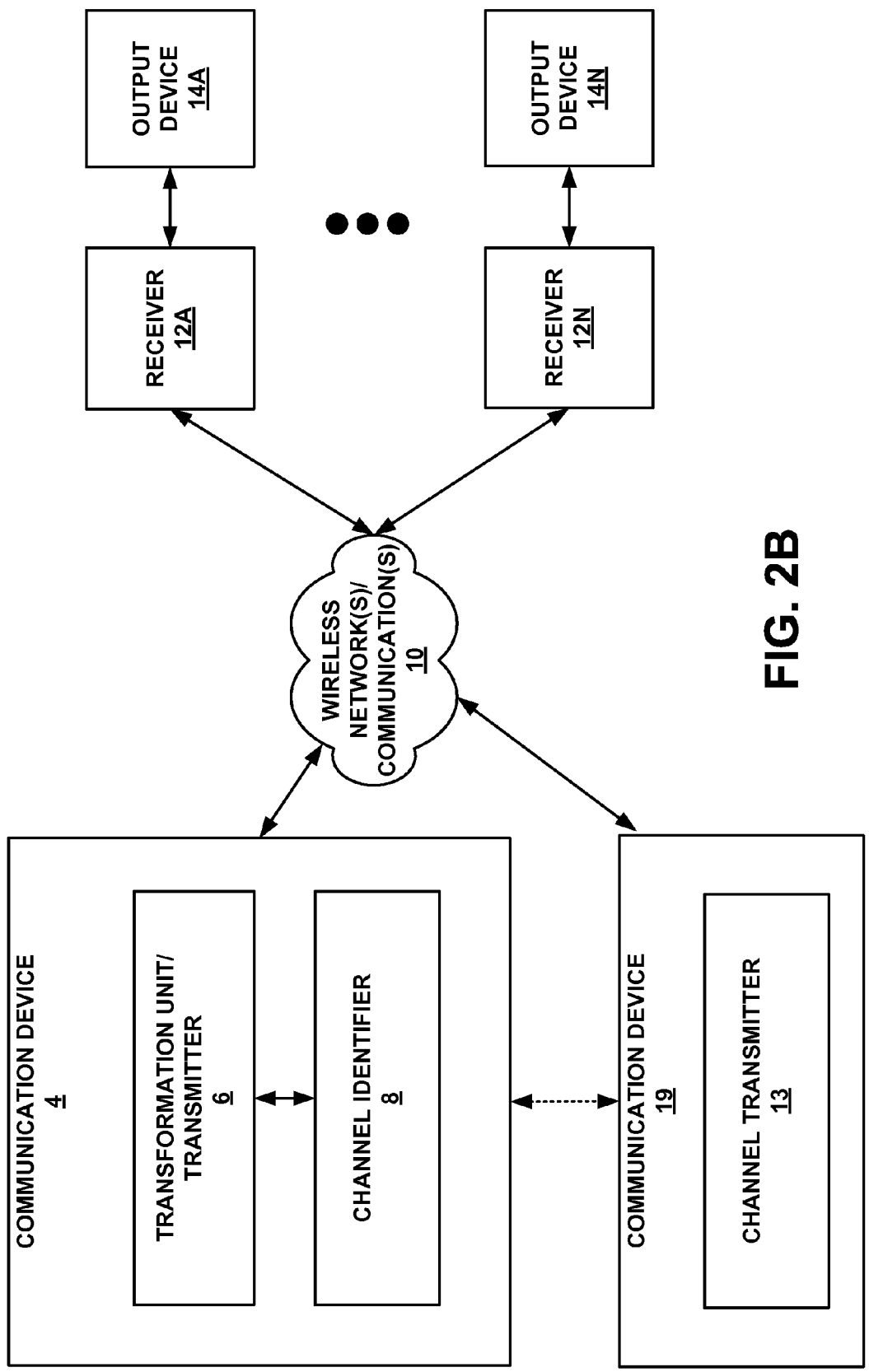
FIG. 2B is a block diagram illustrating another example in which the channel transmitter is included within a separate device.

FIG. 2B is a block diagram illustrating another example in which channel transmitter 13 is included within a separate communication device 19. In some examples, communication device 19 may comprise a peripheral device with respect to communication device 4, and may communicate with communication device 4 via either a wired or wireless interface.

Figure 3:
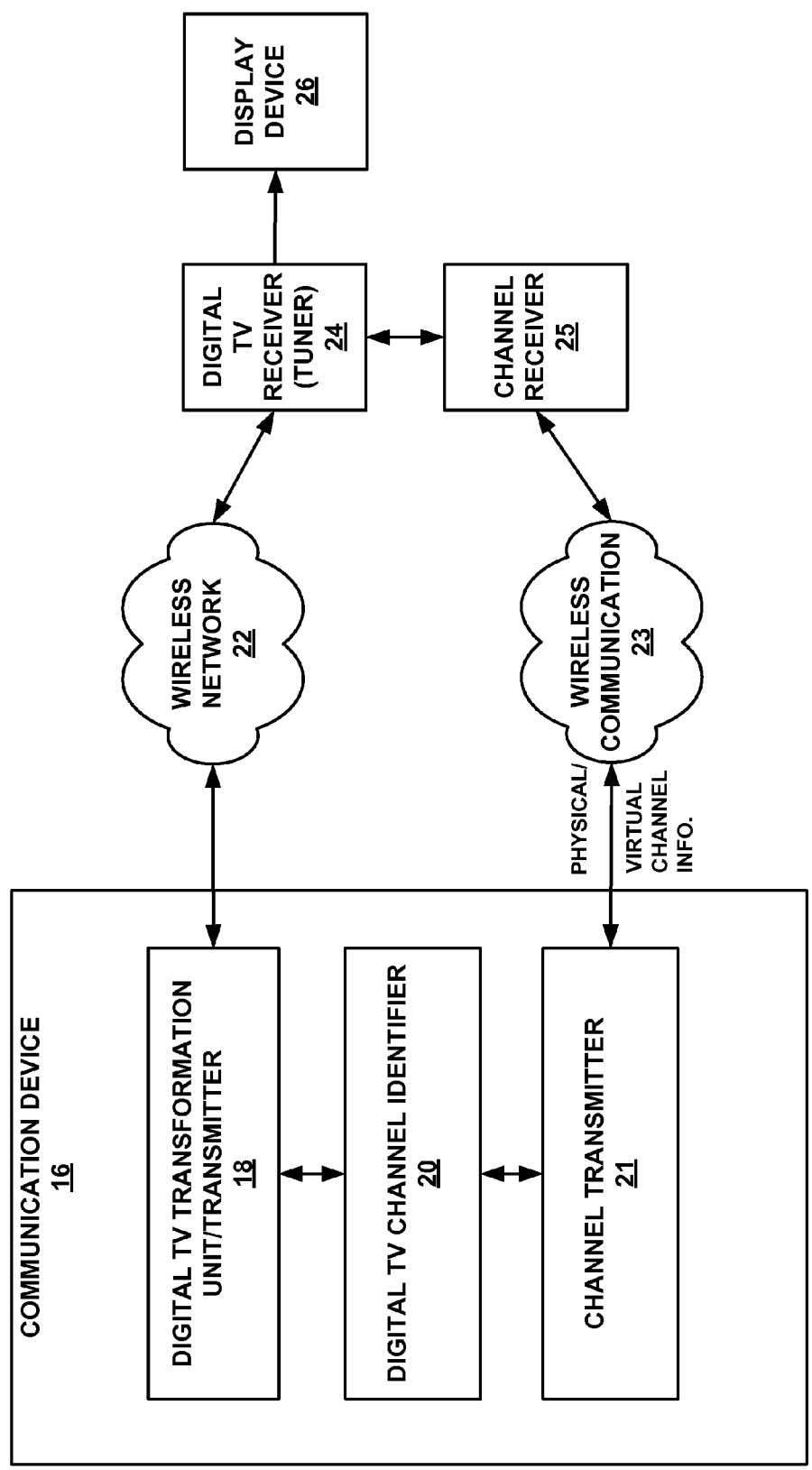
FIG. 3 is a block diagram illustrating an example of a communication device, including a channel transmitter, which is communicatively coupled to a television receiver and to a channel change receiver over different wireless networks.

FIG. 3 is a block diagram illustrating an example of a communication device 16, which may include a digital TV channel identifier 20 and digital TV transformation unit/transmitter 18, being communicatively coupled to digital TV receivers 24 and 25 via respective wireless networks 22 and 23. In FIG. 3, digital TV channel identifier 20 of communication device 16 is one example of a channel identifier, such as channel identifier 8 of communication device 4 shown in FIG. 2A or channel identifier 5 of communication system 1 shown in FIG. 1. Furthermore, in FIG. 3, display device 26 is but one example of an output device that may be coupled to a data receiver that receives data from communication device 16. Display device 26 is coupled to digital TV receiver 24, and is therefore capable of displaying multimedia content.

In FIG. 3, digital TV transformation unit/transmitter 18 and digital TV channel identifier 20 are shown to be included within the same communication device 16. However, in some alternate examples, these components 18, 20 may be included within a communication system that includes one or more separate devices, including one or more peripheral devices.

Communication device 16 is capable of receiving, processing, and generating multimedia data. Communication device 16 is further capable of broadcasting multimedia data to one or more other devices, such as display devices 26, through wireless network 22. Digital TV transformation unit/transmitter 6 is capable of transforming multimedia data into a digital broadcast format, e.g., encoding multimedia data that complies with a particular digital broadcast TV format, such as ATSC, and modulating the encoded multimedia data.

Digital TV channel identifier 20 is able to identify at least one available TV channel in an unused portion of a broadcast TV spectrum for the particular digital broadcast TV format, where such identification is initiated by communication device 16. In some cases, digital TV channel identifier 20 may identify multiple available channels that may be needed for multimedia broadcast based upon any specific requirements or needs of applications or services that are executed on communication device 16.

Upon identification of the one or more available channels, transformation unit/transmitter 18 may transmit the transformed data (e.g., encoded, modulated multimedia data) to digital TV receiver 24, for display upon display device 26, via wireless network 22 (e.g., network supporting digital broadcast formats) using the at least one identified available channel. In some cases, communication device 16 will initiate one or more of the above-described operations, either automatically or via user input, based upon the execution of one or more services, or applications, locally running on communication device 16.

Channel transmitter 21 may include functionality that is similar to that of channel transmitter 13 (FIG. 2A) and/or channel transmitter 11 (FIG. 1). In the particular example shown in FIG. 3, channel transmitter 21 transmits channel information to channel receiver 25 via wireless communication 23, where wireless communication 23 (e.g., an infrared or other radio frequency communication) comprises a different communication from that provided across wireless network 22. Thus, in this example, digital TV transformation unit/transmitter 18 may transmit multimedia data via wireless network 22 using an available channel that is identified by digital TV channel identifier 20. Digital TV receiver 24 may receive the transmitted (e.g., broadcast) data via wireless network 22.

Channel transmitter 21, however, may transmit channel command information to channel receiver 25 via a different wireless communication 23. Channel receiver 25 may then interpret and process the received information, and provide channel information to digital TV receiver 24. The channel information received from channel receiver 25 allows digital TV receiver 24 to tune in to the proper channel across which data is transmitted from digital TV transformation unit/transmitter 18 via wireless network 22.

Thus, in one scenario, digital TV channel identifier 20 may identify a first available channel. Digital TV transformation unit/transmitter 18 may transmit data across this first channel via wireless network 22. Channel transmitter 21 may transmit command information to channel receiver 25 that allows channel receiver 25 to determine or identify the first channel. Channel receiver 25 provides channel information identifying the first channel to digital TV receiver 24, which is then able to tune to the first channel in order to receive the data transmitted from digital TV transformation unit/transmitter 18 via wireless network 22.

If, subsequently, digital TV channel identifier 20 determines that the first channel is no longer available for use, it may identify a second, different channel for use by transformation unit/transmitter 18 in transmitting data via wireless network 22. Channel transmitter 21 may transmit command information to channel receiver 25 that allows channel receiver 25 to determine or identify the second channel, either directly or indirectly (e.g., by identifying the channel explicitly or providing incremental channel up/down information).

Channel receiver 25 provides channel information identifying the second channel to digital TV receiver 24, which is then able to tune to the second channel in order to receive the data transmitted from digital TV transformation unit/transmitter 18 via wireless network 22. In some cases, channel transmitter 21 may transmit channel, or channel change, information for a particular channel to channel receiver 25 prior to transformation unit/transmitter 18 transmitting any data across this particular channel. By doing so, digital TV receiver 24 is capable of changing its tuning settings with minimal disruption to the user of display device 26.

The command or channel information provided by channel transmitter 21 may, in some instances, comprise a command or channel information pertaining to a physical or a virtual channel. Thus, initially, channel transmitter 21 may transmit channel information comprising a first channel identifier that, upon receipt, allows channel receiver 25 to determine a first identified channel of the spectrum. When the channel has changed, channel transmitter 21 may transmit channel information comprising a second channel identifier that, upon receipt, allows channel receiver 25 to determine a second identified channel of the spectrum. The first and/or second channel identifier may comprise an identifier that identifies a physical or, in some cases, a virtual channel.

In those examples in which channel transmitter 21 transmits information pertaining to a virtual channel or a virtual channel change, channel transmitter 21 may include or be otherwise coupled to a virtual channel table (not shown) that maps virtual channels to physical channels that are used by digital TV transformation unit/transmitter 18 to transmit data via wireless network 22. The virtual channel may comprise a major channel number and a minor channel number (e.g., in the format "{major channel number}.{minor channel number}"). The minor channel number may, in some cases, identify a particular program for a given channel.

When changing from one virtual channel to another, channel transmitter 21 may provide channel change information. For instance, channel transmitter 21 may initially provide virtual channel information associated with virtual channel "42.2", and may subsequently provide channel information associated with virtual channel "42.5" to indicate a channel change from virtual channel "42.2" to "42.5". Each of these virtual channels may be mapped to a physical channel and/or program, and channel receiver 25 may also include or be coupled to a virtual channel table (not shown) to map virtual channels to physical channels and/or programs.

In some examples, digital TV receiver 24 and channel receiver 25 are physically distinct devices. In some cases, they are included within a common device.

Figure 4:
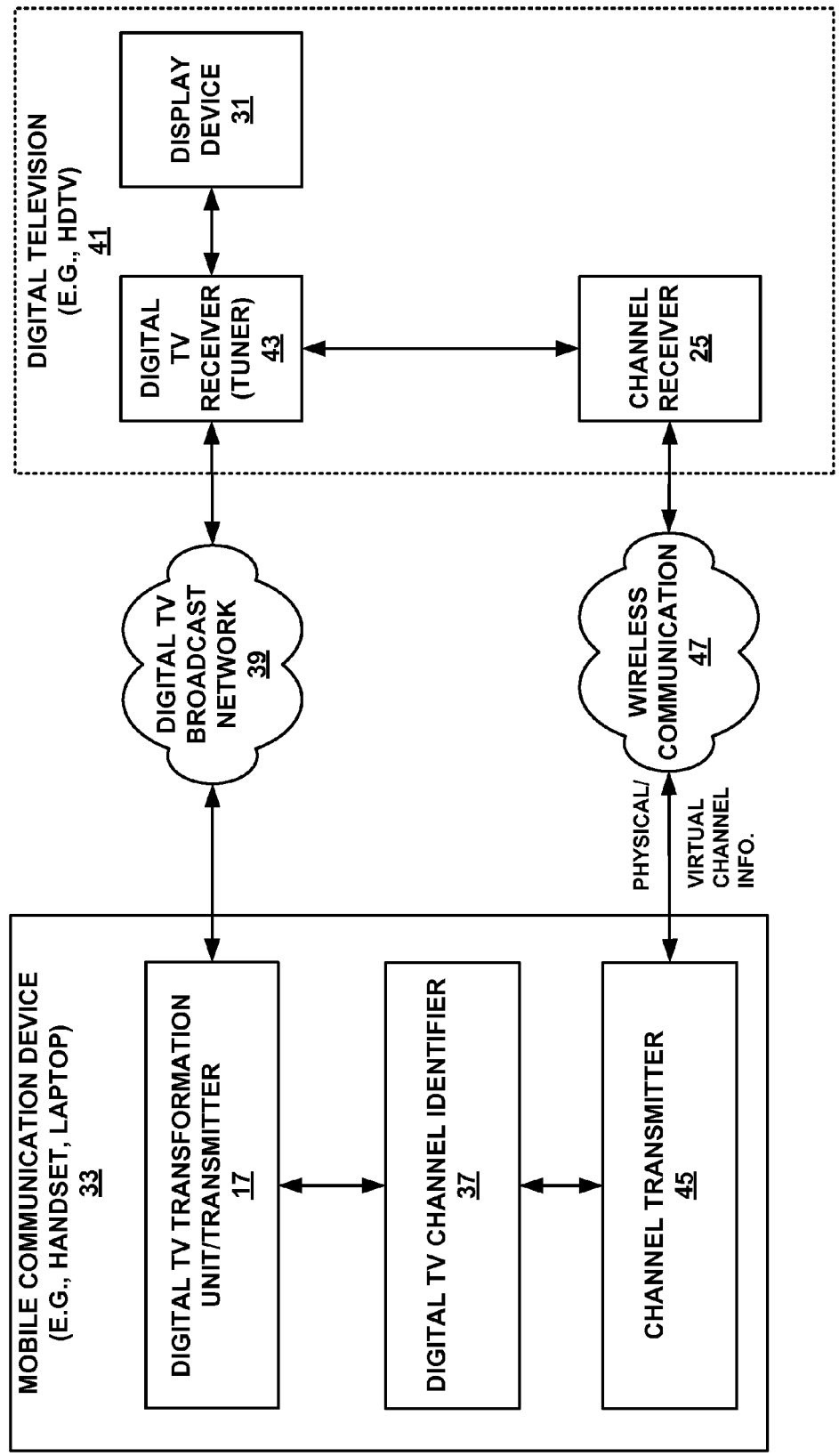
FIG. 4 is a block diagram illustration an example of a mobile communication device being communicatively coupled to a digital TV receiver and a display device, which may be included within a digital TV.

FIG. 4 is a block diagram illustration an example of a mobile communication device 33 (e.g., mobile handset, laptop) being communicatively coupled to a digital TV receiver 43 and a display device 31, which may be included within a digital TV 41 (e.g., high-definition television). Mobile communication device 33 may comprise any form of mobile device, such as a mobile communication handset, a personal computer or laptop computer, a digital multimedia player, a personal digital assistant (PDA), a video game console, or other video device.

In FIG. 4, digital TV transformation unit/transmitter 17, digital TV channel identifier 37, and channel transmitter 45 are shown to be included within the same mobile communication device 33. However, in some alternate examples, these components 17, 37, 45 may be included within a communication system that includes one or more separate devices, including one or more peripheral devices.

Mobile communication device 33 is capable of receiving, processing, and generating multimedia data. Mobile communication device 33 is further capable of broadcasting multimedia data to digital TV receiver 43 through digital TV broadcast network 39. Digital TV transformation unit/transmitter 17 is capable of transforming multimedia data into a digital broadcast format, e.g., encoding multimedia data that complies with a particular digital broadcast TV format, such as ATSC, and modulating the encoded multimedia data.

Digital TV channel identifier 37 is able to identify at least one available TV channel in an unused portion of a broadcast TV spectrum for the particular digital broadcast TV format, where such identification is initiated by mobile communication device 33. In some cases, digital TV channel identifier 37 may identify multiple available channels that may be needed for multimedia broadcast based upon any specific requirements or needs of applications or services that are executed on mobile communication device 33.

Upon identification of the one or more available channels, transformation unit/transmitter 17 may transmit the transformed data (e.g., encoded, modulated multimedia data) to digital TV receiver 43, via broadcast network 39, using the at least one identified available channel. In some cases, mobile communication device 33 will initiate one or more of the above-described operations, either automatically or via user input, based upon the execution of one or more services, or applications, locally running on mobile communication device 33. In some cases, digital TV receiver 43 may be included within digital TV 41.

As shown in FIG. 4, mobile communication device 33 may identify one or more available channels to broadcast multimedia data from mobile communication device 33 to digital television 41, providing a convenient way to extend content from a mobile device to a television (e.g., large screen and/or high-definition television) without the need for using any wires or other physical connections. Display device 31 may, in various examples, comprise a flat panel Liquid Crystal Display (LCD), a flat panel plasma display, a projection display device, a projector device, or the like.

Mobile communication device 33 further includes channel transmitter 45. Channel transmitter 45 is capable of sending channel information to channel receiver 25 via wireless communication 47. Wireless communication 47 may, in some cases, comprise an infrared or other radio frequency communication. Channel receiver 25 is capable of providing channel information to digital TV receiver 43. Similar to channel transmitter 21 of FIG. 3, channel transmitter 45 may provide command or channel information pertaining to physical or virtual channels, to provide channel receiver 25 with corresponding physical or virtual channel change information.

Figure 5:
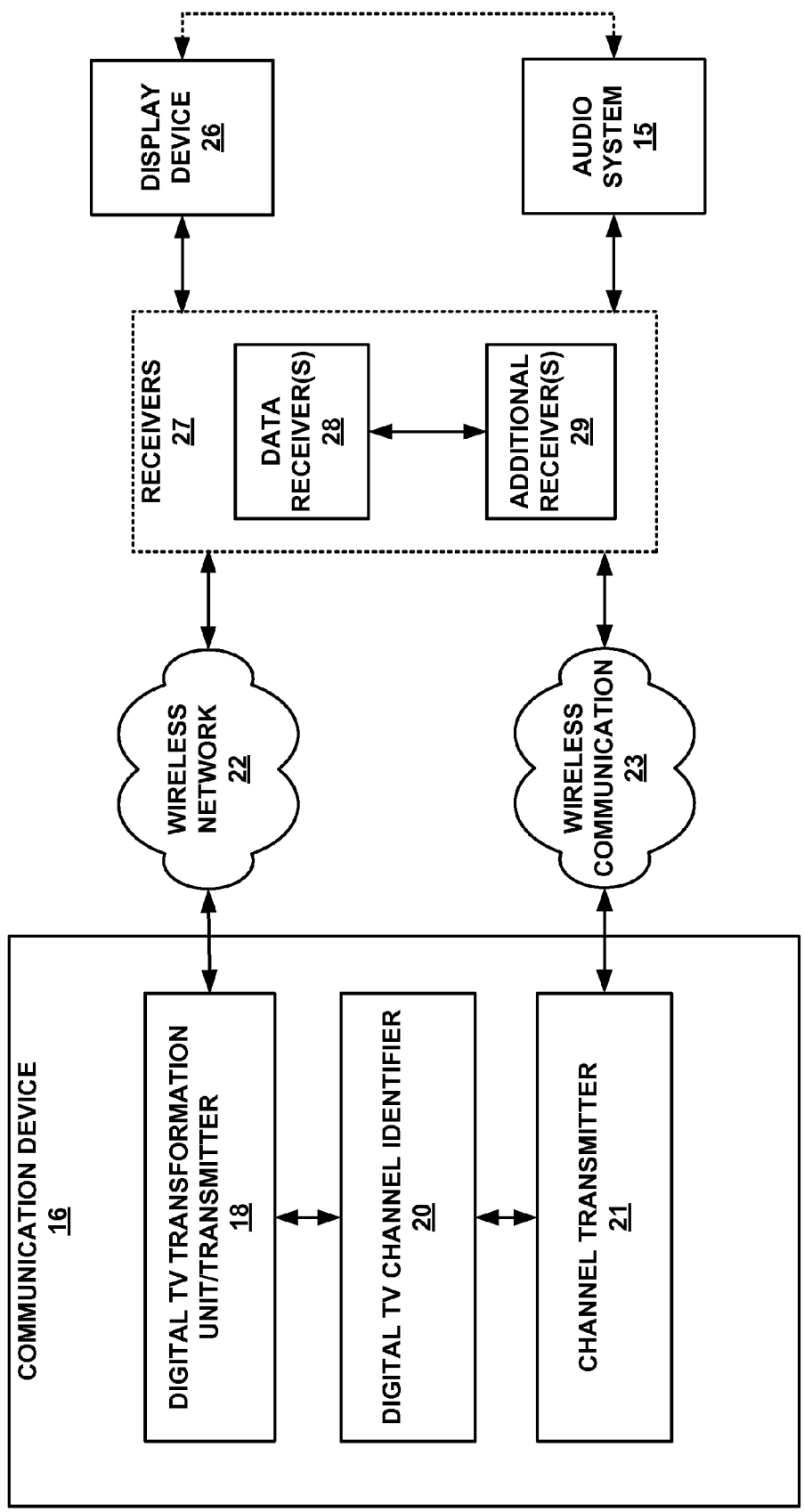
FIG. 5 is a block diagram illustrating an example of a communication device, including a channel transmitter, which is communicatively coupled to multiple receivers via different wireless networks, wherein the receivers are further coupled to a display device and an audio system.

FIG. 5 is a block diagram illustrating an example of communication device 16, including a channel transmitter 21, which is communicatively coupled to multiple receivers 27 via different wireless networks 22 and 23, wherein the receivers 27 are further coupled to a display device 26 and an audio system 15.

Similar to the example of FIG. 3, communication device 16 communicates via multiple wireless networks 22 and 23. Digital TV transformation unit/transmitter 18 is capable of transmitting data via wireless network 22, which is received by one or more data receivers 28. Channel transmitter 21 is capable of transmitting channel command information, via a different wireless communication 23, to one or more additional receivers 29. Data receivers 28 and additional receivers 29 are both included within receivers 27. Data receivers 28 and additional receivers 29 may be included within a common device, or may comprise physically distinct devices. Additional receivers 29 may include one or more channel receivers.

In one aspect, additional receivers 29 may be coupled to both a display device 26 and an audio system 15. One of additional receivers 29, serving as a channel receiver (e.g., similar to channel receiver 25 shown in FIG. 3) may be coupled to display device 26. One of additional receivers 29 may be coupled to audio system 15. In some cases, a given one of additional receivers 29 may be coupled to both display device 26 and audio system 15.

When additional receivers 29 receive channel command information from channel transmitter 21, additional receivers 29 may determine the transmission channel used by digital TV transformation unit/transmitter 18 in transmitting data via wireless network 22. Additional receivers 29 may provide information identifying the transmission channel to data receivers 28.

As shown in FIG. 5, receivers 27 may be coupled to display device 26 and audio system 15. In one example, digital TV transformation unit/transmitter 18 may transmit video data via wireless network 22. Data receivers 28 may receive the transmitted video data, and provide such data for display on display device 26. Digital TV transformation unit/transmitter 18 may also transmit audio data via wireless network 22, which may be received by data receivers 28 and provided to audio system 15. In some cases, the video and audio data may be transmitted in one or more streams by digital TV transformation unit/transmitter 18. As shown in FIG. 5, display device 26 and audio system 15 may optionally be communicatively coupled to each other.

Channel transmitter 21 may communicate channel information to additional receivers 29, via wireless communication 23, which includes channel information for the channel in wireless network 22 across which the video and audio data may be transmitted, according to this particular example. In some cases, channel transmitter 21 may further communication supplemental data, which may be included within the channel information or may be provided separately. For instance, the supplemental data may include one or more audio parameters used by audio system 15 when controlling the audio output. These audio parameters may include one or more volume parameters, as will be described in further detail below. By providing supplemental audio parameters, channel transmitter 21 of communication device 16 is capable of controlling certain functionality of audio system 15.

Figure 6:
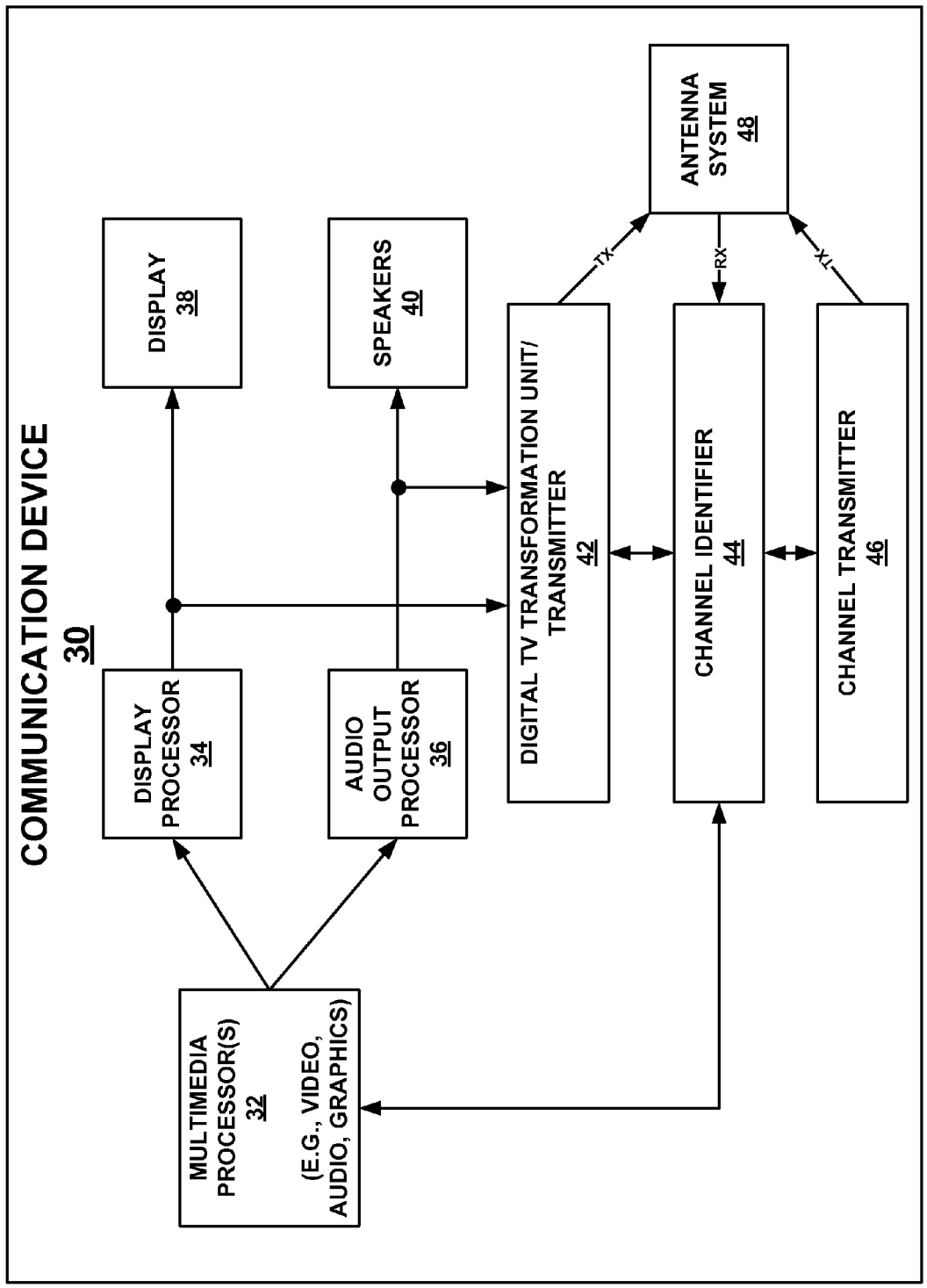
FIG. 6 is a block diagram illustrating an example of a communication device that may be used as the communication device shown in any of FIGS. 1-5.

FIG. 6 is a block diagram illustrating an example of a communication device 30 that may be used as the communication device shown in any of FIGS. 1-5. As shown in the example of FIG. 6, communication device 30 includes various components. For example, in this particular example, communication device 30 includes one or more multimedia processors 32, a display processor 34, an audio output processor 36, a display 38, speakers 40, a digital TV transformation unit/transmitter 42, and a channel identifier 44. Multimedia processors 32 may include one or more video processors, one or more audio processors, and one or more graphics processors. Each of the processors included within multimedia processors 32 may include one or more decoders.

Multimedia processors 32 are coupled to both display processor 34 and audio output processor 36. Video and/or graphics processors included within multimedia processors 32 may generate image and/or graphics data that is provided to display processor 34 for further processing and display on display 38. For example, display processor 34 may perform one or more operations on the image and/or graphics data, such as scaling, rotation, color conversion, cropping, or other rendering operations. Any audio processors included within multimedia processors 32 may generate audio data that is provided to audio output processor 36 for further processing and output to speakers 40. A user of communication device 30 is thus able to view and hear representations of the multimedia data via display 38 and speakers 40.

In addition to providing output multimedia data to display 38, display processor 34 may also provide its output to digital TV transformation unit/transmitter 42. Further, audio output processor 36 may provide its output to digital TV transformation unit/transmitter 42. As a result, digital TV transformation unit/transmitter 42 is capable of processing multiple streams of multimedia data. In some instances, display processor 34 and/or audio output processor 36 may store corresponding output multimedia data in one or more buffers, which are then accessed by digital TV transformation unit/transmitter 42 to retrieve the data. Digital TV transformation unit/transmitter 42 may include various components, as described in more detail below with reference to FIG. 7 or FIG. 8, for transforming multimedia data into a particular digital broadcast form (e.g., encoding, modulating the data), and transmitting the transformed data to another device via a wireless network in one or more identified available channels. Digital TV transformation unit/transmitter 42 may transmit data via antenna system 48, which may comprise one or more antennae.

In some cases, digital TV transformation unit/transmitter 42 may transform and/or encapsulate multiple received streams of multimedia data from display processor 34 and audio output processor 36 into individual single program transport streams that may be transmitted over multiple broadcast channels. In some cases, the multiple streams of multimedia data may be encapsulated in the same transport stream and transmitted in a single channel. One multimedia stream may be transmitted as a picture-in-picture (PIP) data path that includes supplemental multimedia information or metadata with respect to the multimedia data. Metadata may include, for example, one or more of text, notification messages, program guide information, or menu information. In certain cases, digital TV transformation unit/transmitter 42 may receive data directly from multimedia processors 32. In these cases, digital TV transformation unit/transmitter 42 may transform and/or encapsulate the data received directly from multimedia processors into transport streams that may be transmitted.

In order for communication device 30 to be able to broadcast or otherwise transmit multimedia data in one or more streams to a remote device via a wireless network, communication device 30 identifies one or more available channels in an unused portion of a spectrum upon initiation by communication device 30. Channel identifier 44 is capable of identifying these one or more available channels.

Channel identifier 44 may identify available channels in one or more ways. For example, channel identifier 44 may utilize a spectrum sensor, such as the spectrum sensor shown in FIG. 7 or FIG. 8, which is able to dynamically sense available channels in one or more frequency bands via antenna system 48. The spectrum sensor may be able to assign certain quality values with respect to the sensed signals (e.g., interference levels, signal-to-noise ratios) in order to determine the quality of any available channels within the spectrum for data transmission. The sensing algorithm may be carried out periodically and may be based on the format of a particular video stream being processed.

Channel identifier 44 may also utilize, either in conjunction with spectrum sensing or independently, geo-location functionality. Geo-location refers to the capability of communication device 30 to determine its geographic coordinates through the use of a geo-location sensor (such as the one shown in FIG. 7), which may comprise, in one example, a GPS sensor. Channel identifier 44 may query an external digital channel database (e.g., a digital TV bands database, such as the one shown in FIG. 7) to obtain a list of available channels via wireless communication. Typically, such an external database may be maintained by one or more external devices or sources, but may be updated based upon requests and data flow from various devices, such as communication device 30.

In one example, channel identifier 44 may send geo-location coordinates regarding the location of communication device 30 to the external digital channel database, such as via a network (e.g., wireless network) connection. Channel identifier 44 may then receive, from the external database, a list of available channels for a geographic region associated with the location of communication device 30, as indicated by the geo-location coordinates. Channel identifier 44 may then select one or more of the identified channels for use, and send data back to the external database regarding the intended use of these frequency channels by communication device 30. The external database may therefore be updated accordingly based upon the received data from communication device 30.

In some cases, the external database, once updated, may indicate that the selected channels are in use by communication device 30 until communication device 30 sends a subsequent message to the external database indicating that the channels are no longer needed or being used. In other cases, the external database may reserve the selected channels for device 30 only for a defined interval of time. In these cases, communication device 30 may need to send a message to the external database within the defined interval of time indicating that device 30 is still using the selected channels, in which case the external database will renew the reservation of the selected channels for a second interval of time for use by device 30.

In some instances, channel identifier 44 may select one or more of the available channels for use based upon the bandwidth demands or needs of any services or applications that are executing on communication device 30, as indicated by, for example, by one or more of multimedia processors 32 during execution. For example, a particular multimedia application may require multiple broadcast streams each having high bandwidth demands. In this situation, channel identifier 44 may allocate multiple different available channels for transmission to accommodate the bandwidth requirements for these multiple broadcast streams.

Channel identifier 44 may, in some cases, identify one or more available channels based upon information received from multiple sources. For example, if channel identifier 44 utilizes both a spectrum sensor and geo-location functionality, channel identifier 44 may need to process channel information from both of these sources when determining which channels may be available for use.

Upon identification of one or more available transmission channels by channel identifier 44, digital TV transformation unit/transmitter 42 may then broadcast or otherwise transmit the multimedia content or data to an external device via a network using the identified transmission channel(s). Communication device 30 may initiate the broadcast transmission directly with such an external device.

As shown in FIG. 6, communication device 30 further includes a channel transmitter 46, which is communicatively coupled to channel identifier 44. Channel transmitter 46 may include functionality similar to that of channel transmitter 11 (FIG. 1), channel transmitter 13 (FIG. 2A), and/or channel transmitter 21 (FIGS. 4 and 5). Channel identifier 44 may provide, to channel transmitter 46, information associated with a channel used by digital TV transformation unit/transmitter 42 in transmitting data via antenna system 48.

Channel transmitter 46 is then capable of transmitting channel command information via antenna system 48 that either directly or indirectly identifies the channel. For example, the channel command information may include a specific identification of the channel. In this example, a data receiver (e.g., one of data receivers 9 in FIG. 1) is able to determine the channel directly from the received command information. In other cases, the channel command information transmitted by channel transmitter 46 may indirectly identify the channel (e.g., via channel up/down information). In these cases, the data receiver is able to determine the channel by processing the received command information along with state or other information that the data receiver has stored relating to the channel that was previously used for data transmission. For instance, if the state or other information stored by the receiver indicates that the previously used channel was five, and if the received command information from channel transmitter 46 specifies a "channel up" operation, the data receiver is able to determine that the new channel is channel six.

Figure 7:
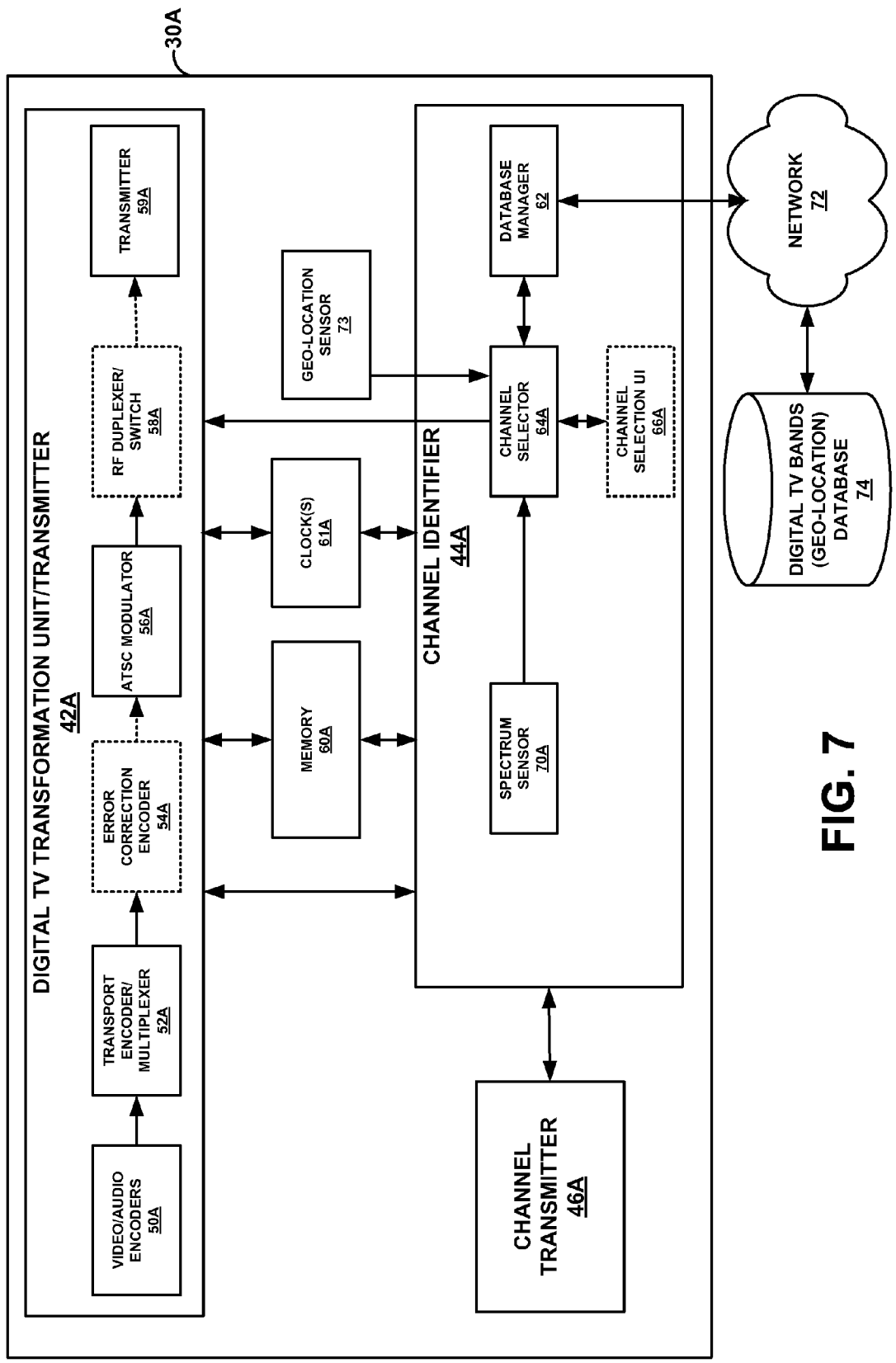
FIG. 7 is a block diagram illustrating an example of a transformation unit/transmitter, in conjunction with a channel identifier, which may be implemented within a communication device, such as the communication device shown in FIG. 6.

FIG. 7 is a block diagram illustrating an example of a digital TV transformation unit/transmitter 42A, in conjunction with a channel identifier 44A, which may be implemented within a communication device 30A. In FIG. 7, digital TV transformation unit/transmitter 42A may be one example of digital TV transformation unit/transmitter 42 shown in FIG. 6, while channel identifier 44A may be one example of channel identifier 44 shown in FIG. 6. In the particular example of FIG. 7, communication device 30A is capable of broadcasting multimedia data according to a specific digital broadcast format, ATSC.

Communication device 30A may facilitate low-power transmission to an ATSC-ready external device, such as a high-definition or flat-panel television. In this case, the ATSC-ready device may comprise one of the output devices 14A-14N shown in FIG. 2A. The ATSC-ready device may, in some examples, include both a display device and a tuner/receiver. In these examples, the ATSC-ready device may comprise digital TV receiver 24 and display device 26.

As shown in FIG. 7, digital TV transformation unit/transmitter 42A may include various components, such as video and/or audio encoders 50A, transport encoder/multiplexer 52A, error correction encoder 54A, ATSC modulator 56A, radio frequency (RF) duplexer/switch 58A, and transmitter 59A. These components help support data transmission over a spectrum implementing the ATSC standard. The ATSC standard is a multi-layered standard that provides layers for video encoding, audio encoding, transport streams, and modulation. In one example, RF duplexer/switch 58A may comprise an ultrahigh frequency (UHF) duplexer/switch. A duplexer may allow for signals to be received for sensing purses and to be transmitted for communication purposes.

Video/audio encoders 50A may include one or more video encoders and one or more audio encoders to encode video and/or audio data into one or more streams. For example, video/audio encoders 50A may include a Moving Picture Experts Group-2 (MPEG-2) encoder or a H.264 encoder (from the Telecommunication Standardization Sector, ITU-T) to encode video data. Video/audio encoders 50A may also include a Dolby Digital (Dolby AC-3) encoder to encoder audio data. An ATSC stream may contain one or more video programs and one or more audio programs. Any of the video encoders may implement a main profile for standard definition video or a high profile for high-definition resolution video.

Transport (e.g., MPEG-2 Transport Stream, or TS) encoder/multiplexer 52A receives the encoded data streams from video/audio encoders 50A and is capable of assembling these data streams for broadcast, such as into one or more packetized elementary streams (PESs). These PESs may then be packetized into individual program transport streams. Transport encoder/multiplexer 52A may optionally, in some instances, provide the output transport streams to an error correction encoder 54A (e.g., a Reed-Solomon encoder), which may perform error correction encoding functionality by adding one or more error correction codes associated with the transport streams. These error correction codes may be used by a data receiver (e.g., data receivers 9 containing error correction unit 11) for error correction or mitigation.

ATSC modulator 56A is capable of modulating the transport streams for broadcast. In some example cases, for instance, ATSC modulator 56A may utilize 8 vestigial side band (8VSB) modulation for broadcast transmission. RF duplexer/switch 58A may then duplex the transport streams, or act as a switch for the transport streams. Transmitter 59A is capable of broadcasting one or more transport streams to one or more external devices using one or more available channels that are identified by channel identifier 44A.

Channel identifier 44A includes a database manager 62, a channel selector 64A, an optional channel selection user interface (UI) 66A, and a spectrum sensor 70A. Both channel identifier 44A and digital TV transformation unit/transmitter 42A are coupled to a memory 60A, which may comprise one or more buffers. Channel identifier 44A and digital TV transformation unit/transmitter 42A may exchange information directly, or may also exchange information indirectly through the storage and retrieval of information via memory 60A.

Channel identifier 44A includes a spectrum sensor 70A. As discussed previously, a spectrum sensor, such as spectrum sensor 70A, is capable of sensing signals in one or more frequency bands within a broadcast spectrum for a particular digital TV format, such as ATSC. Spectrum sensor 70A may determine channel availability and signal strengths based upon its ability to identify any data that occupies one or more used channels within the spectrum. Spectrum sensor 70A may then provide information to channel selector 64A as to the channels that are currently unused, or available. For example, spectrum sensor 70A may detect that a particular channel is available if it does not detect any data being broadcast on this channel by any external, separate devices.

As shown in FIG. 7, channel selector 64A may also receive information from digital TV bands database via network 72 and database manager 62. Digital TV bands database 74 is located external to communication device 30A and includes information regarding channels that are currently in use or available within the broadcast spectrum for a particular digital TV format, such as ATSC. Typically, the digital TV bands database 74 is updated dynamically as channels are put into use or freed for use by other devices. In some instances, digital TV bands database 74 may be organized by geographic location/region or by frequency bands (e.g., low VHF, high VHF, UHF).

In order for channel identifier 44A to obtain channel availability information from digital TV bands database 74, channel identifier 44A may, in some cases, provide geo-location information as input into digital TV bands database 74. Channel identifier 44A may obtain geo-location information or coordinates from geo-location sensor 73, which may indicate the geographic location of communication device 30A at a particular point in time. Geo-location sensor 73 may, in some examples, comprise a GPS sensor.

Upon receipt of geo-location information from geo-location sensor 73, channel selector 64A may provide such information, as input, to digital TV bands database 74 via database manager 62. Database manager 62 may provide an interface to digital TV bands database 74. In some cases, database manager 62 may store a local copy of selected contents of digital TV bands database 74 as they are retrieved. In addition, database manager 62 may store select information provided by channel selector 64A to digital TV bands database 74, such as geo-location information.

Upon sending geo-location information pertinent to communication device 30A, channel selector 64A may receive from digital TV bands database 74 a set of one or more available channels as presented listed within digital TV bands database 74. The set of available channels may be those channels that are available in the geographic region or location presently occupied by communication device 30A, as indicated by geo-location sensor 73.

Upon receipt of available channel information from either or both of spectrum sensor 70A and digital TV bands database 74, channel selector 64A may select one or more available channels, either automatically or via user input via channel selection UI 66A. Channel selection UI may present available channels within a graphical user interface, and a user of a service or application may select one or more of these available channels.

In some instances, channel selector 64A may automatically select or identify one or more of the available channels that are to be used for broadcast transmission by communication device 30A. For example, channel selector 64A may utilize information provided by one or more of multimedia processors 32 (FIG. 6) to determine which one or more of available channels to identify for broadcast transmission. In some cases, channel selector 64A may select multiple channels based upon the demands or needs of the services or applications that are executing. One or more transport streams associated with these services or applications may be broadcast across one or more of the identified channels by transmitter 59A.

In some cases, database 74, once updated, may indicate that the selected channels are in use by communication device 30A until communication device 30A sends a subsequent message to database 74 indicating that the channels are no longer needed or being used. In other cases, database 74 may reserve the selected channels for communication device 30A only for a defined interval of time. In these cases, communication device 30A may send a message to database 74 within the defined interval of time indicating that device 30A is still using the selected channels, in which case database 74 will renew the reservation of the selected channels for a second interval of time for use by communication device 30A.

One or more clocks 61A may be included within communication device 30A. As shown in FIG. 7, clocks 61A may be utilized by, or drive the operation of, digital TV transformation unit/transmitter 42A and channel identifier 44A. Clocks 61A may be configured or set by communication device 30A. In some cases, clocks 61A may be configured by or synchronized to a clock that is external to device 30A. For example, device 30A may receive clock or timing information from an external device (e.g., via geo-location sensor 73) and may configure or synchronize clocks 61A based upon the received information.

For example, in some scenarios, communication device 30A may implement clock functionality that is common with a receiving device (e.g., one of data receivers 9 of FIG. 1, for example). In these scenarios, both communication device 30A and the receiving device may receive clock or timing information from an external device and synchronize their own internal clocks based upon the received information. In such fashion, communication device 30A and the receiving device may effectively operate using a common clock. Digital TV transformation unit/transmitter 42A and channel identifier 44A may also utilize clocks 61A to synchronize or align certain operations.

As also shown in FIG. 7, communication device 30A further includes a channel transmitter 46A, which is communicatively coupled to channel identifier 44A. Channel identifier 44A may provide, to channel transmitter 46A, information associated with a channel used by digital TV transformation unit/transmitter 42A in transmitting data.

Channel transmitter 46A is then capable of transmitting channel command information that either directly or indirectly identifies the channel. For example, the channel command information may include a specific identification of the channel. In this example, a data receiver (e.g., one of data receivers 9 in FIG. 1) is able to determine the channel directly from the received command information. In other cases, the channel command information transmitted by channel transmitter may indirectly identify the channel (e.g., via channel up/down information). In these cases, the data receiver is able to determine the channel by processing the received command information along with state or other information that the data receiver has stored relating to the channel that was previously used for data transmission.

Figure 8:
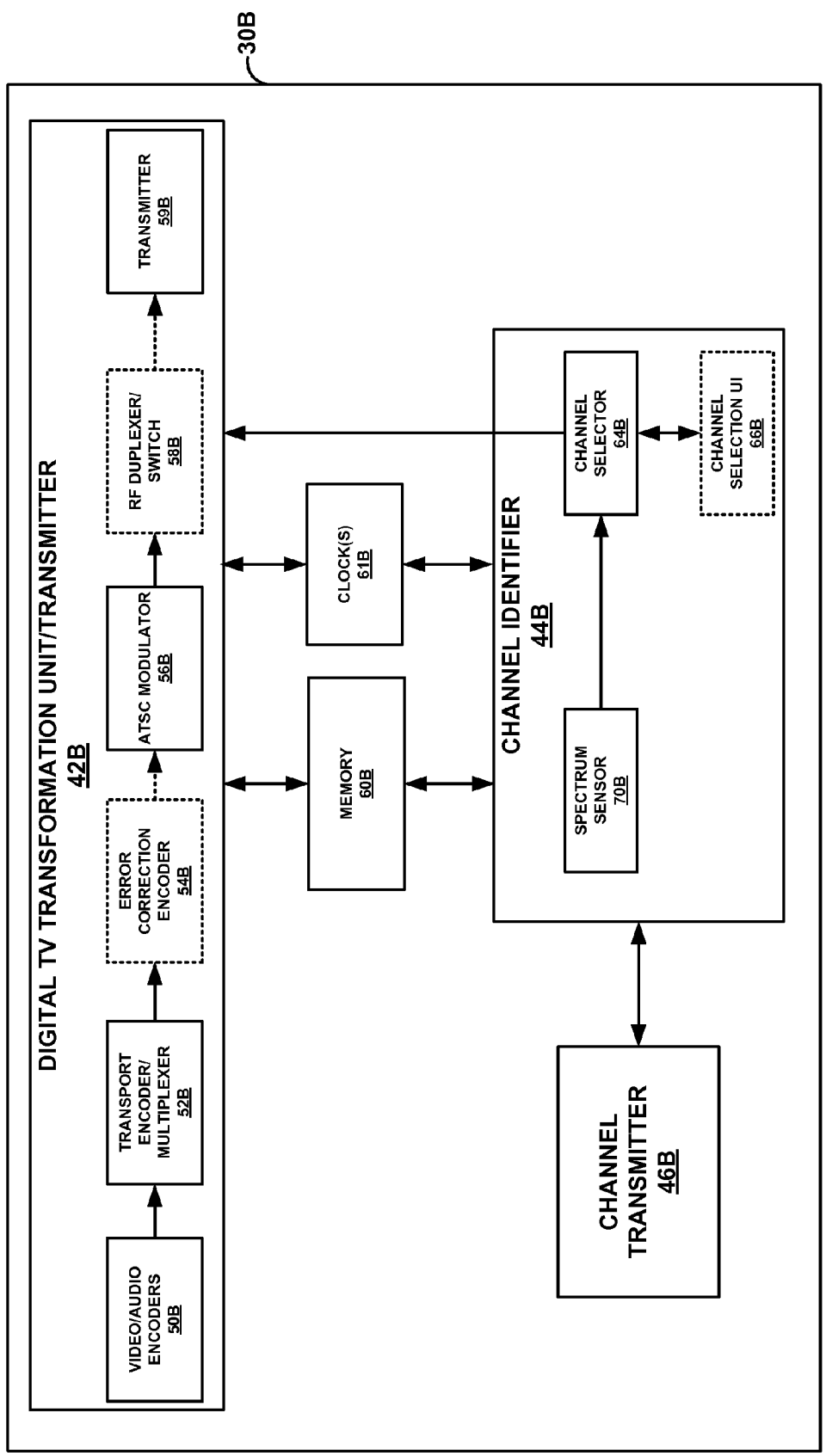
FIG. 8 is a block diagram illustrating another example of a transformation unit/transmitter, in conjunction with a channel identifier, which may be implemented within a communication device, such as the communication device shown in FIG. 6.

FIG. 8 is a block diagram illustrating another example of a digital TV transformation unit/transmitter 42B, in conjunction with a channel identifier 44B, which may be implemented within a communication device 30B. In FIG. 8, digital TV transformation unit/transmitter 42B may be one example of digital TV transformation unit/transmitter 42 shown in FIG. 6, while channel identifier 44B may be one example of channel identifier 44 shown in FIG. 6. Digital TV transformation unit/transmitter 42B and channel identifier 44B may each store and retrieve information from memory device 60B.

Similar to digital TV transformation unit/transmitter 42A, digital TV transformation unit/transmitter 42B includes one or more video/audio encoders 50B, a transport encoder/multiplexer 52B, an error correction encoder 54B, an ATSC modulator 56B, an RF duplexer/switch 58B, and transmitter 59B. One or more clocks 61B may be utilized by both digital TV transformation unit/transmitter 42B and channel identifier 44B.

Channel identifier 44B of FIG. 7 differs from channel identifier 44A of FIG. 7 in that channel identifier 44B does not include a database manager interfacing to a digital TV bands database. In FIG. 8, channel identifier 44B includes only a spectrum sensor 70B. Because no geo-location functionality is implemented in the example of FIG. 8, communication device 30B does not include a geo-location sensor. Channel selector 64B identified one or more available channels for broadcast transmissions based upon the input received from spectrum sensor 70B. Channel selector 64B may also receive a user selection of a channel from a list of available channels via channel selection UI 66B. The list of available channels may be presented on the channel selection UI 66B based upon the sensed signal information provided by spectrum sensor 70B.

Figure 9:
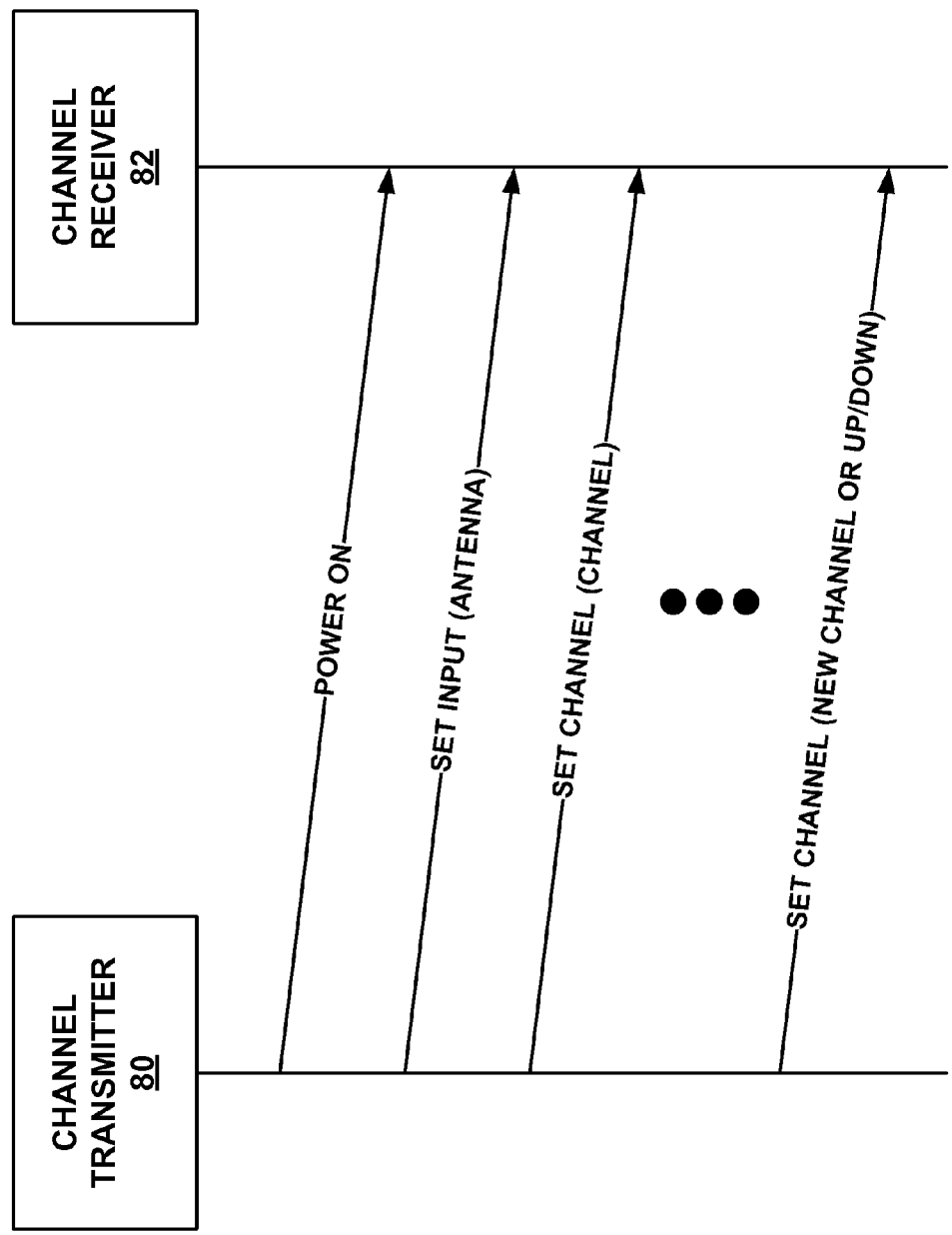
FIGS. 9-12 are various example interaction diagrams that each illustrate a set of commands that are sent from a channel change transmitter to a channel change receiver.

FIGS. 9-12 are various example interaction diagrams that each illustrate a set of commands that are sent from a channel change transmitter to a channel change receiver. FIG. 9 shows an example of a channel transmitter 80 sending one or more commands to a channel change receiver 82. Channel transmitter 80 is one example of a channel transmitter, and may be part of any of the channel transmitters shown in FIGS. 1-6. Channel receiver 82 is one example of a channel receiver, and may be part of channel receiver 25 shown in FIG. 3 or part of additional receivers 29 shown in FIG. 5.

FIG. 9 shows certain command information that is sent from channel transmitter 80 to channel receiver 82. The command information may include one or more commands, or directives. Each of the individual commands shown in FIG. 9 may be sent as separate commands from channel transmitter 80, or may each be included within one or more larger commands sent from channel transmitter 80. For instance, the individual commands "Power On," "Set Input," and "Set Channel" may be sent as separate commands or may be bundled within a single command that is sent from channel transmitter 80. If individual commands are included or bundled within one or more larger commands, channel receiver 82 has the capability of parsing the larger commands and extracting the individual commands for execution or processing.

It is assumed, in FIG. 9, that the device or system including channel transmitter 80 has already selected or identified a channel across which to send data to the device that is coupled to channel receiver 82. Channel transmitter 80 now needs to send command information to channel receiver 82 that will allow channel receiver 82 to identify the channel. The command information may include a "Power On" command, which instructs channel receiver 82 to initiate power to appropriate circuitry within channel receiver 82 that processes channel command information. The command information also may include a "Set Input" command, which allows channel receiver 82 to properly determine how to receive the channel information that is to be transmitted by channel transmitter 80. In the example of FIG. 9, the "Set Input" command instructs channel receiver 82 to receive such channel information from its antenna.

However, at this point, channel receiver 82 may not yet know which channel a data receiver, which may be coupled to channel receiver 82, is to receive the data. It may process the "Set Channel" command, which is included within the command information, to identify the channel. When sending the "Set Channel" command, channel transmitter 80 may either directly or indirectly specify the channel.

Subsequently, it may be assumed that there is a channel change operation. For instance, the channel that was being used by the device including channel transmitter 80 may no longer be available. In this case, the device may select or identify a new channel. Channel transmitter 80 then communicates the channel change information to channel receiver 82. For instance, channel transmitter 80 may send another "Set Channel" command to channel receiver 82 that either directly or indirectly specifies the new channel. For instance, channel transmitter 80 may directly include or specify the new channel number within the "Set Channel" command.

In other cases, the channel command information transmitted by channel transmitter 80 may indirectly identify the channel (e.g., via channel up/down information). In these cases, channel receiver 82 is able to determine the channel by processing the received command information along with state or other information that channel receiver 82 has stored relating to the channel that was previously used for data transmission. For instance, if the state or other information stored by channel receiver 82 indicates that the previously used channel was five, and if the received command information from channel transmitter 80 specifies a "channel up" operation, channel receiver 82 is able to determine that the new channel is channel six. Channel receiver 82 may then provide an identification of the channel (e.g., channel number) to the data receiver (e.g., one of the data receivers shown in FIGS. 1-5) coupled to channel receiver 82.

Although not shown in FIG. 9, channel transmitter 80 may include, within the command information sent to channel receiver 82, an identification code that uniquely identifies channel receiver 82. Channel receiver 82 may be pre-programmed to include this code, or may receive the code from channel transmitter 80 during initialization or configuration.

When transmitting channel command information that is intended for channel receiver 82, channel transmitter 80 may include this identification code within the command information. Upon receipt of the command information, channel receiver 82 will compare the code included within the information to its own stored code to identify a match, and thereby determine that it should process the command information. In such fashion, channel transmitter 80 may transmit command information that is only to be processed by channel receiver 82 by including such an identification code. Any other channel receivers that may also receive the command information (e.g., in the case of broadcast) may ignore such information upon determining that the identification code included in such information does not match with their own stored codes.

Figure 10:
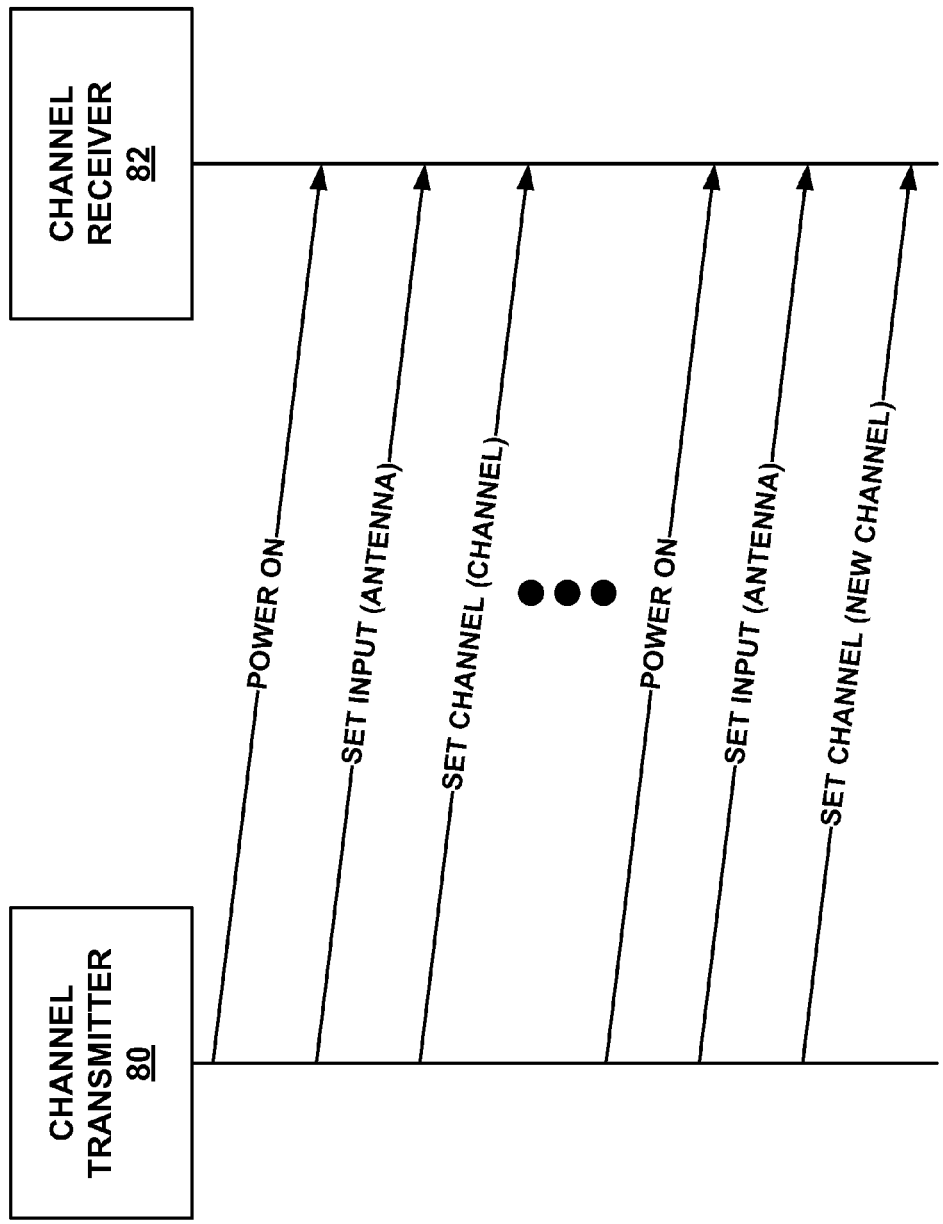

FIG. 10 illustrates another example of a flow of command information from channel transmitter 80 to channel receiver 82. The example of FIG. 10 differs from the example of FIG. 9 in that channel transmitter 80 re-sends "Power On" and "Set Input" commands each time it sends a "Set Channel" command. In the previous example of FIG. 9, after the channel changed, channel transmitter 80 only sent a new "Set Channel" command to channel receiver 82 in order to specify, either directly or indirectly, the new channel.

In FIG. 10, however, after a channel change operation, channel transmitter 80 sends a new "Power On" command, a new "Set Input" command (specifying antenna input), and the "Set Channel" command to specify the new channel. In some cases, it may be desirable to re-send the "Power On" and "Set Input" commands, as shown in FIG. 10. For example, channel receiver 82 may provide certain power or power savings functionality, and channel transmitter 80 may therefore send a "Power On" command prior to any other command that it may need to send to channel receiver 82. In addition, channel transmitter 80 may also send a "Set Input" command prior to each "Set Channel" command that is sent, in order to provide flexibility as to the input source (e.g., antenna input, other input) used by channel receiver 82 in receiving command information provided by channel transmitter 80.

Figure 11:
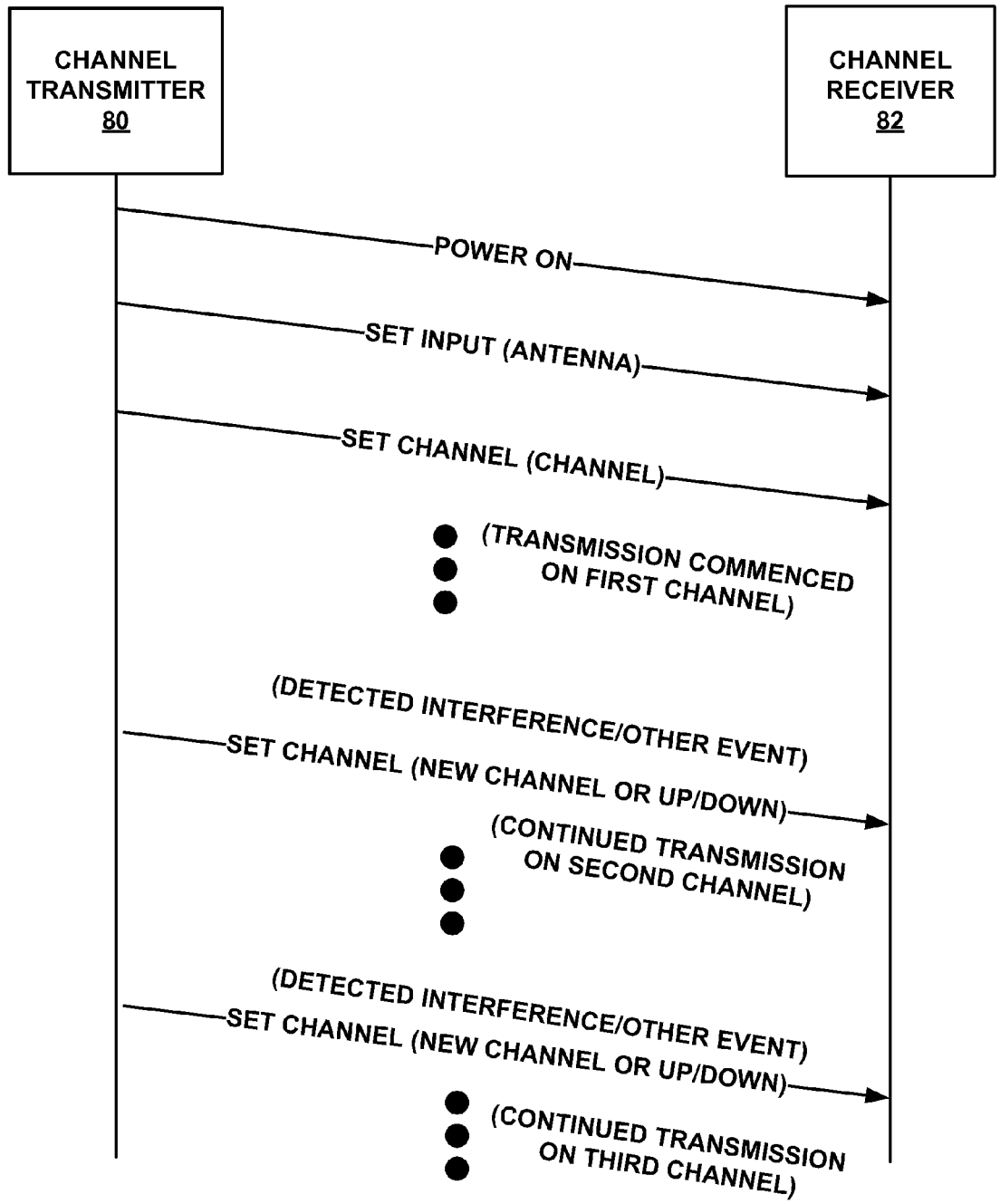

FIG. 11 provides another example of command information that may be sent from channel transmitter 80 to channel receiver 82. In FIG. 11, after channel transmitter 80 sends the "Power On", "Set Input", and "Set Channel" commands, the source communication device that includes or that is otherwise communicatively coupled with channel transmitter 80 may commence transmitting data across a first channel identified by the "Set Channel" command to a data receiver that is coupled to channel receiver 82.

At a particular point in time, the source communication device may detect an event with respect to the first identified channel. For example, the source communication device may detect an amount of interference or noise on the channel that exceeds a defined threshold. In this example, the source communication device may change from the first to a second identified channel for further data transmission. Channel transmitter 80 may send corresponding channel change information, via the "Set Channel" command, to channel receiver 82, to allow channel receiver 82 to identify the newly identified second channel.

In some instances, the detected event may correspond to a timer or other event that causes the source communication device to periodically change the transmission channel, such as from the first channel to the second channel. In these instances, channel transmitter 80 may send the "Set Channel" command to channel receiver 82 to indicate a channel change from the first channel to the second channel.

The source communication device may continue to transmit data across the second, new channel. Subsequently, the source communication device may again detect an event with respect to the first identified channel (e.g., interference/noise event associated with the second channel, timer event). In this case, the source communication device may again perform a channel change from the second to a third identified channel for further data transmission. Channel transmitter 80 may send corresponding channel change information, via the "Set Channel" command, to channel receiver 82, to allow channel receiver 82 to identify the newly identified third channel, which may then be used for subsequent data transmission.

Figure 12:
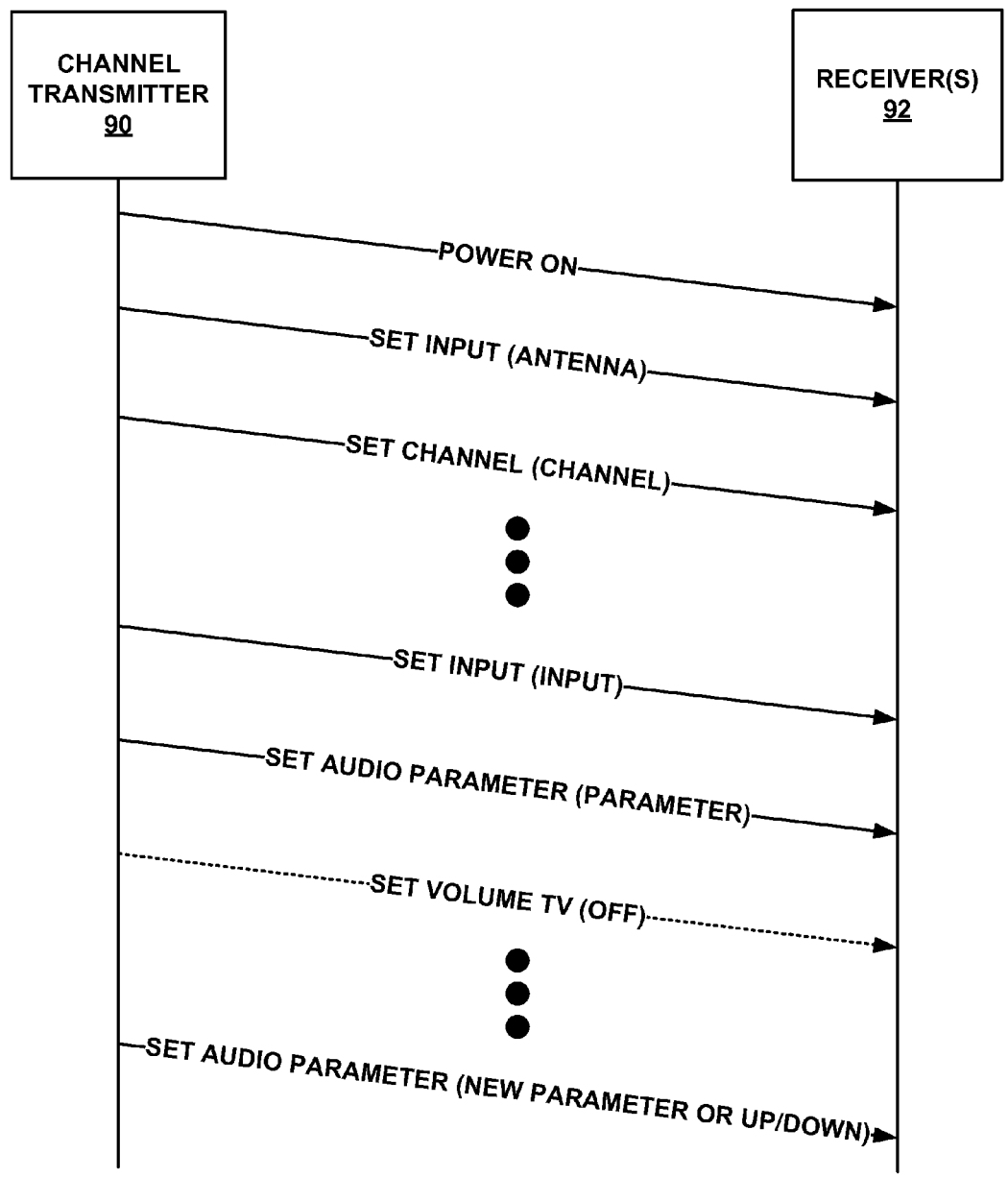

FIG. 12 provides another example of command information that may be sent from a channel transmitter 90 to one or more channel receivers 92. In the example of FIG. 12, channel transmitter 90 may be part of channel transmitter 21 shown in FIG. 5, and channel receivers 92 may be part of additional receivers 29 shown in FIG. 5. Channel receivers 92 may be coupled to audio system 15 and also to display device 26.

FIG. 12 attempts to show how channel transmitter 90 may also transmit supplemental data, which may be included within the channel information or may be provided separately. For instance, the supplemental data may include one or more audio parameters used by audio system 15 when controlling the audio output. These audio parameters may include one or more volume parameters. By providing supplemental audio parameters, channel transmitter 90 is capable of controlling certain functionality of audio system 15

Similar to the examples of FIGS. 9-10, FIG. 12 also shows that channel transmitter 90 may send a "Power On" command and a "Set Input" command to channel receivers 92. The first "Set Input" command sent by channel transmitter 90 may set the input of receivers 92 to the antenna of receivers 92 to receive channel command information provided by channel transmitter 90. Channel transmitter 90 also sends a "Set Channel" command to allow receivers 92 to identify the channel across which data is to be received. Receivers 92 may then provide the channel information to a data receiver coupled to, or included within, receivers 92. For example, receivers 92 may provide such information to a data receiver, such as one of the data receivers shown in FIGS. 1-5.

Channel transmitter 90 may subsequently send another "Set Input" command. In one example, the "Set Input" command may specify an input from display device 26, indicating that receivers 92 and/or audio system 15 are to obtain audio input from display device 26. In this scenario, display device 26 may be receiving audio information via data receivers 28 (FIG. 5).

The supplemental data sent from channel transmitter 90 may include a "Set Audio Parameter" command, which may instruct channel receivers 92 to set a particular audio parameter for audio system 15. For example, the "Set Audio Parameter" command may specify, either directly or indirectly, a volume parameter. In one scenario, the "Set Audio Parameter" may directly specify a volume number, or may indirectly specify a volume setting via an up/down parameter. Upon receipt of the command, channel receiver 92 is capable of changing the volume setting of audio output on audio system 15. Various other audio parameters may also be set by the "Set Audio Parameter" command (e.g., treble, bass, etc.)

Optionally, the supplemental data may also include a "Set Volume TV" command. For instance, if the audio system 15 is providing the audio output (e.g., surround sound speaker output) for an end user, it may be desirable to mute any audio output provided by display device 26. In such a case, the "Set Volume TV" command may instruct channel receivers 92 to turn the volume of display device 26 off. Subsequently, channel transmitter 90 may send one or more further "Set Audio Parameter" commands to channel receivers 92 to further modify any audio settings of audio system 15.

Thus, as exemplified by the command flow in FIG. 12, channel change transmitter 90 is capable of providing supplemental information to channel receivers 92 that may be used to control any devices that may be coupled to channel receivers 92 during the processing of data. The device including channel transmitter 90 is capable of transmitting, for example, video and audio data to devices coupled to channel receivers 92 (e.g., display device 26 and audio system 15). Channel transmitter 90 is able to provide channel information to channel receivers 92, to allow channel receivers 92 to tune to the proper channel in order to receive the video and audio data. In addition, channel transmitter 90 is capable of transmitting supplemental data that allows channel receivers 92 to control the processing of the received data (e.g., changing the volume of received audio data).

Figure 13:
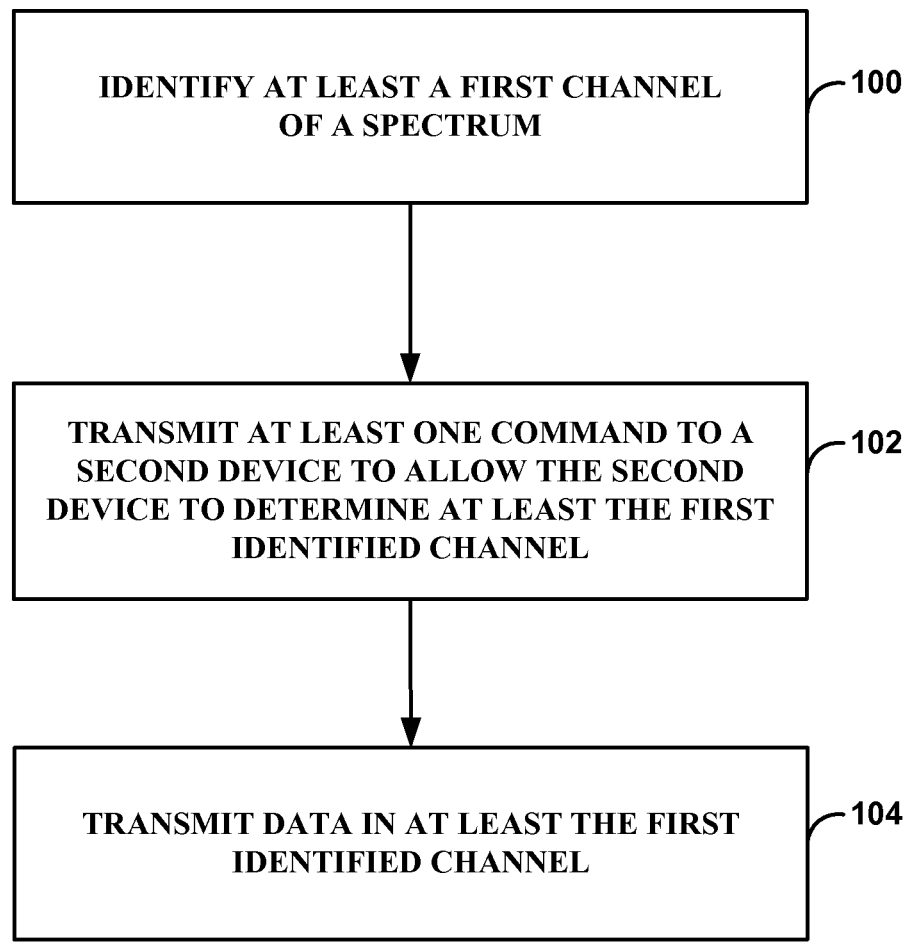
FIG. 13 is a flow diagram illustrating an example of a method that may be performed by a device, such as a device included within the system of FIG. 1 or one of the communication devices shown in FIGS. 2-6.

FIG. 13 is a flow diagram illustrating an example of a method that may be performed by a communication system or device, such as the communication system of FIG. 1 or one of the communication devices shown in FIGS. 2-6. For purposes of illustration only in the description below of FIG. 13, it will be assumed that the method of FIG. 13 may be performed by communication device 30 shown in FIG. 6.

Communication device 30 may identify at least a first channel of a spectrum (100). For example, communication device 30 may use channel identifier 44 to identify the first channel. Communication device 30 may utilize channel transmitter 46 to transmit at least one command to a second, different device (e.g., one of data receivers 9 of FIG. 1), wherein the at least one command contains information that allows the second device to determine at least the first identified channel (102). Communication device 30 may also transmit data in at least the first identified channel (102), such as by using digital TV transformation unit/transmitter 42 to transmit the data.

Communication device 30 may comprise a multimedia communication device having multimedia capabilities, and the data may comprise multimedia data including at least one of audio data, video data, text data, speech data, and graphics data. In some examples, the digital broadcast format may be an ATSC format, a T-DMB format, a DVB format, an ISDB-T format, or an MPEG-TS format (to name only a few examples), though various other digital formats may also be utilized. Device 30 may use one or more video and/or audio encoders (e.g., video/audio encoders 50A shown in FIG. 7 or video/audio encoders 50B shown in FIG. 8) and/or multiplexers, along with one or more modulators/duplexers/switches, when transforming the multimedia data. Transforming the multimedia data may include encoding the multimedia data to comply with the digital broadcast format, and modulating the encoded multimedia data.

Device 30 may identify at least one available channel of a spectrum (e.g., using a channel identifier, such as channel identifier 44 of FIG. 6). Such identification may, in some cases, be initiated by the device. For example, device 30 may use a spectrum sensor (e.g., spectrum sensor 70A of FIG. 7 or spectrum sensor 70B of FIG. 8) and/or information accessed from a digital TV bands database (e.g., digital TV bands database 74 of FIG. 7) to identify the at least one available channel. In some cases, device 30 may identify the at least one available channel in an unused portion of a broadcast spectrum, such as a broadcast television spectrum. In some cases, the at least one available channel may comprise television band white space. The digital broadcast format may comprise an ATSC format, a T-DMB format, a DVB format, an ISDB-T format, or an MPEG-TS format, to name only a few non-limiting examples.

In some examples, device 30 may utilize the channel identifier to identify at least one other available channel for subsequent transmission and/or broadcasting of data if the at least one available channel becomes occupied (e.g., by a licensed user). In some cases, device 30 may use the channel identifier to detect, during at least one subsequent time interval, whether the at least one identified available channel is still available or has become occupied by another user. Device 30 may use the spectrum sensor and/or access the geo-location database, in some cases, when making a determination as to whether any channel or channels of the spectrum is/are available for use.

In one example, device 30 may include a geo-location sensor (e.g., geo-location sensor 73 of FIG. 7) to determine geographic coordinates of device 30. Device 30 may then provide the geographic coordinates as input to the digital TV bands database.

After device 30 has identified at least one available channel, device 30 may transmit (e.g., via transmitter 59A of FIG. 6 or transmitter 59B of FIG. 7) the transformed data (e.g., to one or more separate, external devices) in the at least one identified available channel. For example, device 30 may initiate a broadcast transmission to one or more external output devices, such as television devices, upon request of device 30.

Device 30 may transmit data across a first wireless network, but may transmit the at least one command, which allows a second device to determine the identified available channel, across another wireless communication means (e.g., one of the wireless communication means shown in FIGS. 1-5). For instance, digital TV transformation unit/transmitter 42 may transmit data across one wireless network using an available channel, and channel transmitter 46 may transmit command information across another wireless communication means to a channel receiver of a remote, receiving device. The command information may directly or indirectly identify the available channel. For example, the command information may directly specify the channel.

Channel transmitter 46 may send commands to different remote devices (e.g., different ones of data receivers 9 shown in FIG. 1) to allow the different remotes devices to identify the identified available channel. Channel transmitter 46 may include different codes within the commands that allow the remote devices to determine which commands they should process. For example, channel transmitter 46 may send one command to a channel receiver of one remote device, where the command includes an identification code that is uniquely associated with this remote device. Upon receipt of the command, the remote device may process the command upon analysis of the identification code.

Channel transmitter 46 may send another command to a channel receiver of another remote device, where this command includes a different identification code that is uniquely associated with this other remote device. In such fashion, channel transmitter 46 is capable of sending distinct commands to different remote devices using a common wireless network, where the distinct commands allow each of the remote devices to identify the channel across which data is sent from digital TV transformation unit/transmitter 42.

In some instances, device 30 may identify another available channel of the spectrum. Device 30 may also use its channel transmitter to transmit a command to a remote device (e.g., one or more of data receivers 9 of FIG. 1), wherein the command contains information that allows the remote device to determine a change to the newly identified channel. Device 30 may use its digital TV transformation unit/transmitter to transmit further data in the newly identified available channel.

For example, device 30 may initiate the process of identifying another available channel upon its detection that the identified channel is no longer available for further use (e.g., if there is a defined amount of interference or noise on the channel). In some instances, device 30 may periodically identify other available channels for subsequent use.

In some instances, device 30 may transmit channel change/command information via its channel transmitter to communicate a change from one virtual channel to another virtual channel. In these instances, the at least one command may comprise a first virtual channel identifier that allows the second device to determine at least the first identified channel of the spectrum, and at least the second command may comprise a second virtual channel identifier that allows the second device to determine at least the second identified channel of the spectrum.

In some instances, a command transmitted from the channel transmitter may identify an input source to be used by the remote receiving device to receive the transmitted data on the identified channel. For example, as shown in FIG. 1, the channel transmitter may provide a "set input" command or directive that directs the channel receiver of the remote device to utilize a particular input source to receive the data sent from the digital TV transformation unit/transmitter 42 of device 30.

The channel transmitter of device 30 may select a transmit power for transmitting any commands to the remote device. In some cases, device 30 may automatically select the transmit power. In other cases, device 30 may select the transmit power based upon user input to device 30. Device 30 may select a lower transmit power, for instance, if there is a clearer path (e.g., clear line-of-sight path) between device 30 and the remote, receiving device. Device 30 may select a higher transmit power if there is not as clear a path, or if there is a large distance between device 30 and the remote device. These are just a few examples in which device 30 may adjust the transmit power when sending commands from channel transmitter 46.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:
1. A method comprising:
identifying, at a first device, a first channel of a spectrum;
transmitting a first command to a second device, wherein the first device is distinct from the second device, wherein the first command includes first information that enables the second device to determine the first channel, and wherein the first command identifies an input source of the second device to be used by the second device to receive first data via the first channel; and
transmitting the first data via the first channel.

2. The method of claim 1, wherein identifying the first channel comprises identifying an available channel included in an unused portion of a broadcast television spectrum.

3. The method of claim 1, wherein identifying the first channel comprises identifying television band white space.

4. The method of claim 1, further comprising encoding the first data based on a digital broadcast format prior to transmitting the first data via the first channel.

5. The method of claim 4, wherein the digital broadcast format comprises an Advanced Television Systems Committee (ATSC) format, a Terrestrial Digital Multimedia Broadcasting (T-DMB) format, a Digital Video Broadcasting (DVB) format, an Integrated Services Digital Broadcasting Terrestrial (ISDB-T) format, or a Moving Picture Experts Group Transport Stream (MPEG-TS) format.

6. The method of claim 1, wherein:
transmitting the first data comprises transmitting the first data via the first channel of a first wireless network; and
transmitting the first command comprises transmitting the first command to the second device via an alternate wireless communication, and wherein the alternate wireless communication is distinct from the first wireless network.

7. The method of claim 1, further comprising:
identifying a second channel of the spectrum;
transmitting a second command to the second device, wherein the second command includes second information that enables the second device to determine a change from the first channel to the second channel; and
transmitting a second data via the second channel.

8. The method of claim 7, wherein the first command comprises a first virtual channel identifier that enables the second device to determine the first channel, and wherein the second command comprises a second virtual channel identifier that enables the second device to determine the second channel.

9. The method of claim 1, wherein the first information included in the first command specifies the first channel.

10. The method of claim 1, wherein transmitting the first command comprises selecting a transmit power associated with a transmission of the first command.

11. The method of claim 1, further comprising:
transmitting a third command to a third device, the third command including the first information that enables the third device to determine the first channel;
wherein the first command includes a first identification code, the first identification code being uniquely associated with the second device; and
wherein the third command includes a second identification code, the second identification code being uniquely associated with the third device.

12. The method of claim 1, wherein transmitting the first command comprises transmitting the first command from the first device to the second device.

13. The method of claim 1, wherein the first channel is identified by a spectrum sensor.

14. The method of claim 1, wherein identifying the first channel comprises accessing a digital television (TV) bands database to identify the first channel.

15. The method of claim 1, wherein the first command comprises a virtual channel identifier that enables the first device to determine the first channel.

16. A communication system comprising:
one or more processors;
a channel identifier operable to identify a first channel of a spectrum;
a channel transmitter operable to transmit a first command to a first device, wherein the first command includes first information that enables the first device to determine the first channel, and wherein the first command identifies an input source of the first device to be used by the first device to receive a first data via the first channel; and
a transmitter operable to transmit the first data via the first channel.

17. The communication system of claim 16, wherein the channel identifier is operable to identify the first channel by identifying an available channel included in an unused portion of a broadcast television spectrum.

18. The communication system of claim 16, wherein the channel identifier is operable to identify the first channel by identifying television band white space.

19. The communication system of claim 16, wherein the one or more processors are operable to encode the first data based on a digital broadcast format prior to transmitting the first data via the first channel.

20. The communication system of claim 19, wherein the digital broadcast format comprises an Advanced Television Systems Committee (ATSC) format, a Terrestrial Digital Multimedia Broadcasting (T-DMB) format, a Digital Video Broadcasting (DVB) format, an Integrated Services Digital Broadcasting Terrestrial (ISDB-T) format, or a Moving Picture Experts Group Transport Stream (MPEG-TS) format.

21. The communication system of claim 16, wherein:
the transmitter is operable to transmit the first data via the first channel of a first wireless network; and
the channel transmitter is operable to transmit the first command to the first device via an alternate wireless communication, and wherein the alternate wireless communication is distinct from the first wireless network.

22. The communication system of claim 16, wherein:
the channel identifier is further operable to identify a second channel of the spectrum;
the channel transmitter is further operable to transmit a second command to the first device, and wherein the second command includes second information that enables the first device to determine a change from the first channel to the second channel; and
the transmitter is further operable to transmit second data via the second channel.

23. The communication system of claim 22, wherein the first command comprises a first virtual channel identifier that enables the first device to determine the first channel, and wherein the second command comprises a second virtual channel identifier that enables the first device to determine the second channel.

24. The communication system of claim 16, wherein the first information included in the first command specifies the first channel.

25. The communication system of claim 16, wherein the channel transmitter is further operable to select a transmit power associated with a transmission of the first command.

26. The communication system of claim 16, wherein the channel transmitter is further operable to transmit a second command to a second device that enables the second device to determine the first channel.

27. The communication system of claim 26, wherein:
the first command includes a first identification code, the first identification code being uniquely associated with the first device; and
the second command includes a second identification code, the second identification code being uniquely associated with the second device.

28. The communication system of claim 16, wherein the channel identifier is operable to identify the first channel using a spectrum sensor.

29. The communication system of claim 16, wherein the channel identifier is operable to access a digital television (TV) bands database to identify the first channel.

30. The communication system of claim 16, wherein the one or more processors, the channel identifier, the channel transmitter, and the transmitter are included in a wireless communication device handset.

31. The communication system of claim 16, wherein the one or more processors, the channel identifier, the channel transmitter, and the transmitter are included in one or more integrated circuit devices.

32. A communication system comprising:
 means for identifying a first channel of a spectrum;
 means for transmitting a first command to a first device, wherein the first command includes first information that enables the first device to determine the first channel; and
 means for transmitting a first data via the first channel, wherein the means for transmitting the data via the first channel comprises means for transmitting the first data via a first wireless network, and wherein the means for transmitting the first command comprises means for transmitting the first command via another wireless communication means.

33. The communication system of claim 32, further comprising means for encoding the first data based on a digital broadcast format prior to transmitting the first data via the first channel.

34. The communication system of claim 33, wherein the digital broadcast format comprises an Advanced Television Systems Committee (ATSC) format, a Terrestrial Digital Multimedia Broadcasting (T-DMB) format, a Digital Video Broadcasting (DVB) format, an Integrated Services Digital Broadcasting Terrestrial (ISDB-T) format, or a Moving Picture Experts Group Transport Stream (MPEG-TS) format.

35. The communication system of claim 32, further comprising:
 means for identifying a second channel of the spectrum;
 means for transmitting a second command to the first device, wherein the second command includes second information that enables the first device to determine a change from the first channel to the second channel; and
 means for transmitting a second data via the second channel.

36. The communication system of claim 32, wherein the first command identifies an input source of the first device to be used by the first device to receive the first data via the first channel.

37. The communication system of claim 32, wherein the means for transmitting the first command comprises means for selecting a transmit power associated with a transmission of the first command.

38. The communication system of claim 32, further comprising means for transmitting a second command to a second device, the second command including the first information that enables the second device to determine the first channel, and wherein:
 the first command includes a first identification code, the first identification code being uniquely associated with the first device; and
 the second command includes a second identification code, the second identification code being uniquely associated with the second device.

39. A computer-readable storage medium comprising instructions that, when executed by one or more processors, cause the one or more processors to:
 identify a first channel of a spectrum;
 transmit a first command to a first device, wherein the first command includes first information that enables the first device to determine the first channel;
 initiate a first transmission of first data via the first channel; and
 determine whether the first channel becomes unavailable during the first transmission of the first data.

40. The computer-readable storage medium of claim 39, further comprising instructions that, when executed by the one or more processors, cause the one or more processors to encode the first data based on a digital broadcast format prior to initiating the first transmission of the first data via the first channel.

41. The computer-readable storage medium of claim 40, wherein the digital broadcast format comprises an Advanced Television Systems Committee (ATSC) format, a Terrestrial Digital Multimedia Broadcasting (T-DMB) format, a Digital Video Broadcasting (DVB) format, an Integrated Services Digital Broadcasting Terrestrial (ISDB-T) format, or a Moving Picture Experts Group Transport Stream (MPEG-TS) format.

42. The computer-readable storage medium of claim 39, further comprising instructions that, when executed by the one or more processors, cause the one or more processors to:
 transmit the first portion of the data via the first channel of a first wireless network; and
 transmit the first command to the first device via an alternate wireless communication, wherein the alternate wireless communication is distinct from the first wireless network.

43. The computer-readable storage medium of claim 39, further comprising instructions that, when executed by the one or more processors, cause the one or more processors to:
 identify a second channel of the spectrum;
 transmit a second command to the first device, wherein the second command includes second information that enables the first device to determine a change from the first channel to the second channel; and
 initiate a second transmission of a second data via the second channel.

44. The computer-readable storage medium of claim 43, wherein the first command comprises a first virtual channel identifier that enables the first device to determine the first channel, and wherein the second command comprises a second virtual channel identifier that enables the first device to determine the second channel.

45. The computer-readable storage medium of claim 39, wherein the first command identifies an input source of the first device to be used by the first device to receive the first data via the first channel.

46. The computer-readable storage medium of claim 39, further comprising instructions that, when executed by the one or more processors, cause the one or more processors to select a transmit power associated with a transmission of the first command.

47. The computer-readable storage medium of claim 39, further comprising instructions that, when executed by the one or more processors, cause the one or more processors to transmit a second command to a second device, wherein:
 the second command enables the second device to determine the first channel;

the first command includes a first identification code the first identification code being uniquely associated with the first device; and the second command includes a second identification code, the second identification code being uniquely associated with the second device.

48. The computer-readable storage medium of claim 39, further comprising instructions that, when executed by the one or more processors, cause the one or more processors to:

determine whether a detected amount of interference associated with the first channel exceeds a threshold value; and when the detected amount of interference exceed the threshold value:
identify a second channel of the spectrum;
transmit a second command to the first device, wherein the second command includes second information that enables the first device to initiate a change from the first channel to the second channel, and
initiate a second transmission second data via the second channel.

49. The computer-readable storage medium of claim 39, wherein the first command comprises a virtual channel identifier that enables the first device to determine the first channel.

50. A wireless communication device comprising:
a processor;
a channel identifier operable to identify a first channel of a spectrum;
a channel transmitter operable to transmit a first command to a device, wherein the first command includes information that enables the device to determine the first channel; and
a transmitter operable to transmit data via the first channel.

51. The wireless communication device of claim 50, wherein the transmitter transmits the data via the first channel of a first wireless network, wherein the channel transmitter transmits the first command via an alternate wireless communication, and wherein the alternate wireless communication is distinct from the first wireless network.

52. The wireless communication device of claim 50, wherein:
the first command comprises a first virtual identifier that enables the device to determine the first channel,
the channel identifier identifies a second channel of the spectrum, and
the channel transmitter transmits a second command to the device, wherein the second command comprises a second virtual identifier that enables the device to determine the second channel.

53. The wireless communication device of claim 50, wherein the device comprises a data receiver coupled to an audio system, a display device, or a combination thereof.

54. The wireless communication device of claim 50, wherein the first command indicates an input source to be used by the second device to receive the data.

* * * * *